United States Patent
Siddiqu

(10) Patent No.: US 11,773,245 B1
(45) Date of Patent: Oct. 3, 2023

(54) PVC COMPOSITES CONTAINING FUNCTIONALIZED ASPHALTENE

(71) Applicant: KING FAHD UNIVERSITY OF PETROLEUM AND MINERALS, Dhahran (SA)

(72) Inventor: Mohammad Nahid Siddiqu, Dhahran (SA)

(73) Assignee: KING FAHD UNIVERSITY OF PETROLEUM AND MINERALS, Dhahran (SA)

(*) Notice: Subject to any disclaimer, the term of this patent is extended or adjusted under 35 U.S.C. 154(b) by 0 days.

(21) Appl. No.: 18/047,108

(22) Filed: Oct. 17, 2022

Related U.S. Application Data

(63) Continuation of application No. 17/747,109, filed on May 18, 2022, now Pat. No. 11,492,479.

(51) Int. Cl.
*C08L 27/06* (2006.01)
*C10C 3/00* (2006.01)

(52) U.S. Cl.
CPC .................... *C08L 27/06* (2013.01)

(58) Field of Classification Search
CPC ...... C08L 27/06; C08L 95/00; C08L 2555/34; C08K 3/04; C10G 2300/206; C10C 3/005
USPC .......................................... 524/64
See application file for complete search history.

(56) References Cited

FOREIGN PATENT DOCUMENTS

| CN | 1562714 A | 1/2005 |
|---|---|---|
| CN | 103013143 B | 9/2013 |
| CN | 109096658 A | 12/2018 |
| CN | 108448096 B | 1/2021 |
| KR | 10-2260136 | 6/2021 |
| SU | 1033511 A | 8/1983 |
| SU | 1033511 A1 * | 8/1983 |

OTHER PUBLICATIONS

Asmael ; Investigate engineering properties of modified open-graded asphalt mixtures ; Cogent Engineering, 6 ; Oct. 13, 2019 ; 12 Pages.
Nguyen, et al. ; Properties of Stone Matrix Asphalt Modified with Polyvinyl Chloride and Nano Silica ; Polymers, 13 ; Jul. 19, 2021; 13 Pages.
W.V. Titow, "PVC Plastics: properties, processing, and applications", Ch.3, p. 53-101 (Elsevier Science Publishers, New York, 1990 . (Year: 1990).
Plastic Density Table (https://hudsonriverpark.org/app/uploads/2020/06/Plastic-Density-Table.pdf) (Year: 2010).
EiC Search—14980652 (Year: 2017).

* cited by examiner

*Primary Examiner* — Ling Siu Choi
*Assistant Examiner* — Ronald Grinsted
(74) *Attorney, Agent, or Firm* — Oblon, McClelland, Maier & Neustadt, L.L.P.

(57) ABSTRACT

A polyvinyl chloride-asphaltene composite and a method of making the polyvinyl chloride-asphaltene composite is disclosed. The composite includes a polyvinyl chloride (PVC) polymer in an amount of 90 to 99.5 wt.%, based on a total weight of the polyvinyl chloride-asphaltene composite, and a filler in an amount of 10 wt.% or less, based on a total weight of the polyvinyl chloride-asphaltene composite. The filler is an asphaltene, the asphaltene is the only filler present, and the asphaltene is uniformly dispersed within a matrix of the PVC polymer. The polyvinyl chloride-asphaltene composite of the present disclosure demonstrates enhanced thermal stability and improved mechanical tensile or thermo-mechanical properties.

17 Claims, 21 Drawing Sheets

PVC/Functionalized Asphaltene Composite

PVC COMPOSITES CONTAINING FUNCTIONALIZED ASPHALTENE

CROSS-REFERENCE TO RELATED APPLICATIONS

The present application is a Continuation of U.S. application Ser. No. 17/747,109, now allowed, having a filing date of May 18, 2022.

BACKGROUND OF THE INVENTION

TECHNICAL FIELD

The present disclosure is directed to polymer composites, and particularly to polyvinyl chloride-asphaltene-based polymer composites and a method of preparing the same.

DESCRIPTION OF THE RELATED ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Polymer composites are mixtures of polymers with inorganic or organic additives. Generally, the additives, such as fillers, are added for cost reduction as a relatively lesser amount of polymeric material would be required and to improve processing characteristics that reduce the necessary time and energy. However, most of the conventionally used fillers, because of their unfavorable geometrical features, surface area, or surface chemical composition, may only moderately increase the modulus of the polymer, whereas strength (tensile, flexural) and/or thermal degradation properties remain unchanged or even decreased. Therefore, there exists a need to develop a polymer composite with enhanced thermal and mechanical properties.

BRIEF SUMMARY OF THE INVENTION

In an exemplary embodiment, a polyvinyl chloride-asphaltene composite is described. The polyvinyl chloride-asphaltene composite includes a polyvinyl chloride (PVC) polymer in an amount of 90 to 99.5 weight percent (wt.%), based on a total weight of the polyvinyl chloride-asphaltene composite, and a filler in an amount of 10 wt.% or less, based on a total weight of the polyvinyl chloride-asphaltene composite, where the filler is an asphaltene, and the asphaltene is the only filler present. The asphaltene is uniformly dispersed within a matrix of the PVC polymer.

In some embodiments, the polyvinyl chloride-asphaltene composite consists essentially of the PVC polymer and the asphaltene.

In some embodiments, the polyvinyl chloride-asphaltene composite consists of the PVC polymer and asphaltene.

In some embodiments, the PVC polymer has a density of 1.10 to 1.45 grams per centimeter cubed ($g/cm^3$) and a number average molecular weight of 20,000 to 105,000 grams per mole (g/mol).

In some embodiments, the asphaltene in the polyvinyl chloride-asphaltene composite is extracted from Arabian medium crude oil.

In some embodiments, the asphaltene has a hydrogen-to-carbon atomic ratio of 1.1 to 1.25.

In some embodiments, the asphaltene comprises 80 to 86 wt.% of carbon atoms, 6.2 to 10.0 wt.% of hydrogen atoms, 10 to 20 parts per million (ppm) of nickel, and 30 to 60 ppm of vanadium, each based on a total weight of the asphaltene.

In some embodiments, the asphaltene has a ratio of aliphatic carbons to aromatic carbons of 1.5:1 to 3:1, and a ratio of aliphatic hydrogens to aromatic hydrogens of 8:1 to 14:1.

In some embodiments, the asphaltene is an acid-functionalized asphaltene including oxygen-containing functional groups which are at least one selected from the group consisting of nitro groups, carbonyl groups, and carboxyl groups.

In some embodiments, the asphaltene is present in an amount of 0.25 wt.% to 7.5 wt.% based on the total weight of the polyvinyl chloride-asphaltene composite.

In some embodiments, the asphaltene is present in an amount ranging from 0.5 wt.% to 5 wt.% based on the total weight of the polyvinyl chloride-asphaltene composite.

In some embodiments, the asphaltene is present in an amount of 0.25 wt.% to 7.5 wt.% based on the total weight of the polyvinyl chloride-asphaltene composite.

In some embodiments, the asphaltene is present in an amount ranging from 0.5 wt.% to 5 wt.% based on the total weight of the polyvinyl chloride-asphaltene composite.

In some embodiments, the polyvinyl chloride-asphaltene composite has at least two of the following properties: a tensile strength of 68.5 to 80 megapascals (MPa), a yield strength of 30 to 75 MPa, a max load of 315 to 350 newton (N), an elongation at break of 5 to 75%, and a modulus of elasticity of 1650 to 1933 MPa, as determined by ASTM standard D638-02a.

In some embodiments, the polyvinyl chloride-asphaltene composite has at least two of the following properties: a tensile strength of 57.5 to 72.5 MPa, a yield strength of 30 to 70 MPa, a max load of 275 to 330 N, an elongation at break of 5 to 40%, and a modulus of elasticity of 1500 to 1925 MPa, as determined by ASTM standard D638-02a.

In some embodiments, the polyvinyl chloride-asphaltene composite has a thermal degradation at 50% conversion, $T_{50\%}$, which is 5 to 25° C. higher than a polyvinyl chloride devoid of the asphaltene, a thermal degradation onset, T2%, which is 5 to 25° C. higher than a polyvinyl chloride devoid of the asphaltene, or both, as determined by thermogravimetric analysis.

In an exemplary embodiment, a method of preparing the polyvinyl chloride-asphaltene composite is disclosed. The method includes ultrasonically treating the asphaltene and a first organic solvent to form an asphaltene solution and further dispersing PVC polymer in a second organic solvent to form a PVC solution. The method further includes mixing the asphaltene solution and the PVC solution to form a casting mixture, and further removing the first organic solvent and the second organic solvent to form the polyvinyl chloride-asphaltene composite.

In some embodiments, the first organic solvent and the second organic solvent are tetrahydrofuran.

In some embodiments, the asphaltene is an acid-functionalized asphaltene, including oxygen-containing functional groups. The oxygen-containing functional groups are at least one selected from the group consisting of nitro groups and carbonyl and carboxyl groups. In an embodiment, the acid-functionalized asphaltene was prepared by treating asphaltene with nitric acid having a concentration of 50 to 90% in water.

In some embodiments, the asphaltene is derived from the Arabian medium crude oil, and the asphaltene includes 80 to 86 wt.% of carbon atoms, 6.2 to 10.0 wt.% of hydrogen atoms, 10 to 20 ppm of nickel, and 30 to 60 ppm of vanadium, each based on a total weight of the asphaltene, and the PVC polymer has a density of 1.10 to 1.45 g/cm³, and a number average molecular weight of 20,000 to 105,000 g/mol.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
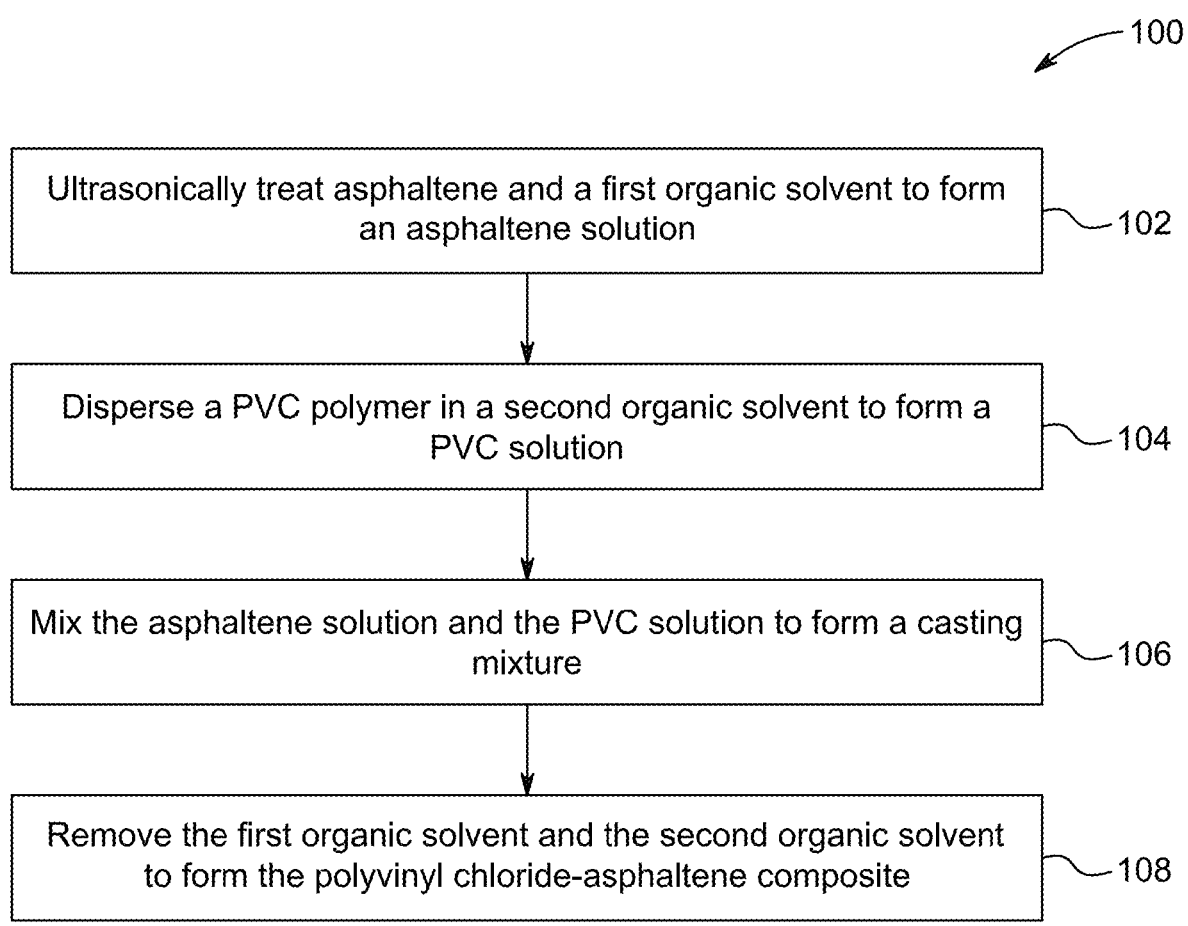
FIG. 1 is a flowchart of a method of preparing a polyvinyl chloride (PVC)/asphaltene composite, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

As used herein, the terms "optional" or "optionally" means that the subsequently described event(s) can or cannot occur or the subsequently described component(s) may or may not be present (e.g. 0 wt.%).

The phrase "substantially free", unless otherwise specified, describes an amount of a particular component (e.g., low density polyethylene), that when present, is present in an amount of less than about 1 wt.%, preferably less than about 0.5 wt.%, more preferably less than about 0.1 wt.%, even more preferably less than about 0.05 wt.%, relative to a total weight of the composition being discussed, and also includes situations where the composition is completely free of the particular component (i.e., 0% wt.).

Polyvinyl Chloride-Asphaltene Composite

The present disclosure is directed to a polyvinyl chloride-asphaltene composite comprising polyvinyl chloride (PVC) polymer and asphaltene. In an aspect of the present disclosure, a composite including the PVC polymer and asphaltene is described. The composite includes a PVC polymer in an amount of 90 to 99.5 wt.%, based on a total weight of the PVC/asphaltene composite. In a preferred embodiment, the amount of PVC polymer ranges from 90 to 98 wt.%, preferably 92 to 97 wt.%, more preferably 94 to 96 wt.%. The composite further includes a filler in an amount of 10 wt.% or less, based on the total weight of the PVC/asphaltene composite. In a preferred embodiment, the filler is present in an amount of 5 wt.% of the total weight of the PVC/asphaltene composite. The filler is asphaltene.

PVC Polymer

In some embodiments, the PVC polymer has a density of 1.10 to 1.45 g/cm³, preferably 1.20 to 1.44 g/cm³, preferably 1.25 to 1.42 g/cm³, preferably 1.30 to 1.40 g/cm³, preferably 1.36 to 1.39 g/cm³, preferably 1.38 g/cm³. In some embodiments, the PVC polymer has a number average molecular weight of 20,000 to 105,000 g/mol, preferably 22,500 to 102,500, preferably 25,000 to 100,000, preferably 27,500 to 97,500, preferably 28,000 to 97,000, preferably 29,000 to 96,000, preferably 20,000 to 95,000. In some embodiments, the PVC polymer has a melt index of 1.5 to 4, preferably 1.75 to 3.5, preferably 2 to 3.25, preferably 2.25 to 3.0, preferably 2.4 to 2.8, preferably 2.5 to 2.7, preferably 2.6. In some embodiments, the PVC polymer has a tensile strength of 60 to 80 MPa, preferably 62.5 to 77.5 MPa, preferably 65 to 75 MPa, preferably 67.5 to 72.5 MPa, preferably 70 MPa.

While the composite material can be made in theory from a mixture of polyvinyl chloride and one or more other polymer types (i.e., the composited polymer can be a copolymer such as a random or a block copolymer), in preferred embodiments, the polymer is a PVC homopolymer (i.e., contains only a single type of repeat unit). For example, the polymer preferably contains only repeating units that can be classified as PVC. When other types of polymers (other than PVC) are present, the polymer preferably contains at least 90 wt.%, preferably at least 95 wt.%, preferably at least 99 wt.% PVC, relative to a total weight of the polymer material. In preferred embodiments, the PVC-asphaltene composite of the present disclosure does not contain as the polymer component other polymers such as polypropylene, high density polyethylene, or low density polyethylene, either as stand-alone polymers or as copolymers with the PVC.

Further, pristine PVC may be employed in the composite materials herein, or alternatively, aged/recycled or treated PVC polymers may be employed. In other words, the PVC polymer may be purchased or made fresh and the pristine PVC, containing unmodified polymerized vinyl chloride, may be directly incorporated into the PVC-asphaltene composite. In other embodiments, the PVC polymer may be obtained by melting used and/or aged and/or recycled PVC materials and incorporating said used/aged/recycled PVC material into the PVC-asphaltene composite. The used/aged/recycled material may contain a relatively intact PVC backbone with some degree of degradation in the form of backbone cleavage and/or surface functionalization (e.g., alcohol, aldehyde, carboxylate, carboxylic acid). In some embodiments, the PVC polymer employed may be treated or chemically modified PVC, for example chlorinated polyvinyl chloride (CPVC). The PVC polymer may be treated with a hydroxide base such as sodium or potassium hydroxide, treated with a mineral acid such as HCl, sulfuric acid, and/or nitric acid, treated with an organic acid such as citric acid, formic acid, acetic acid oxalic acid, and the like, or oxidized with a strong oxidant such as a peroxide, ozone, and corona discharge applications, to change its properties or 'activate' its binding properties by providing reactive surface functionality (e.g., alcohol, aldehyde, carboxylate, carboxylic acid surface functional groups).

The PVC polymer can be made from or obtained from any synthesis method known to those of ordinary skill in the art. For example, the PVC polymer can be formed by a radical process involving an initiator. Examples of commonly-used initiators include dioctanoyl peroxide, benzoyl peroxide, 2,2'-azo-bis-isobutyrylnitrile (AIBN), and dicetyl peroxydicarbonate.

Asphaltene and Functionalized Asphaltene

Asphalt is a colloidal system similar to petroleum, but with lighter molecules removed. Asphalt can be fractionated into 4 major components: saturates, aromatics, resins and asphaltenes. The fractionated part of saturates and aromatics is considered as gas oil. Polarity of these four fractions can be arranged as: saturates<aromatics<resin<asphaltenes. Different sources have different quantities of saturates, aromatics, resins, and asphaltenes. For example, from western Canadian oils saturates may be from 8 to 17 wt.% relative to the total oil, aromatics may be from 36 to 44 wt.% relative to the total oil, resins may be from 18 to 27 wt.% relative to the total oil, asphaltenes may be from 15 to 20 wt.% relative to the total oil; from Arabian oils saturates may be from 22 to 25 wt.% relative to the total oil, aromatics may be from 26 to 50 wt.% relative to the total oil, resin may be 10 to 18 wt.% relative to the total oil, and asphaltenes may be 30 to 36 wt.% relative to the total oil; and from Sumatran oils, saturates from 44 to 46 wt.% relative to the total oil, aromatics may be from 30 to 33 wt.% relative to the total oil, resins may be from 15 to 17 wt.% relative to the total oil, asphaltenes may be from 7 to 10 wt.% relative to the total oil. Oils from different regions have different characterizations based on saturates, aromatics, and resins, and asphaltenes, thus the asphaltenes extracted from these sources also have differing compositions.

Asphaltenes are a distinct chemical component of asphalt (they are different than asphalt), and impart high viscosity to crude oils, negatively impacting production. In general, asphaltenes are organic compounds which are large, planar, aromatic, contain hetero-atoms, and participate in pi-pi stacking. Two types of structures have been postulated: (a) the "continent" or island structure and (b) the "archipelago" structure. The continent structure (a) represents asphaltene as relatively flat disk shape molecules with a dominantly aromatic core (usually consisting of more than seven rings) and a periphery of aliphatic chains. The archipelago structure (b) contains small aromatic groups (up to four rings) which may be connected to each other by aliphatic chains with carbon numbers up to 24. Asphaltenes can be isolated based on solubility by solvent extraction and other methods. Asphaltenes are insoluble in low-boiling saturated hydrocarbons, such as petroleum naphtha, pentane and hexane, but are soluble in carbon tetrachloride and carbon disulfide. Asphaltenes are usually separated from the solvent in the form of a coarse brown-black powder having essentially no cohesiveness.

The chemical composition of asphaltene varies by source. The asphaltenes employed in the present disclosure may be extracted from Arabian Heavy crude oil, Arabian Medium crude oil, or Arabian Light crude oil. Preferably, the asphaltenes are extracted from Arabian Medium crude oil. Compared to asphaltenes obtained from other sources, Arabian Heavy asphaltenes have a relatively low gravity (e.g. about 31° API), a high sulfur content, and a high paraffinic wax content. Other characteristics of preferred Arabian Medium asphaltenes used in the present disclosure are discussed below.

Asphaltenes contain varying amounts of oxygen, sulfur, and nitrogen. They have a low hydrogen-to-carbon ratio, which indicates an intense aromatic nature (benzene has a ratio of about 1.0 and naphthalene about 0.8). The hydrogen-to-carbon ratio ranges from about 0.70 to about 1.20, depending on the source of the original asphalt. Preferred asphaltenes have a hydrogen-to-carbon atomic ratio (as determined by elemental analysis) ranging from 1.1 to 1.25, preferably 1.15-1.20, and more preferably 1.18 to 1.19. Preferred asphaltenes comprise carbon atoms in an amount ranging from 80 to 86 wt.%, preferably 82 to 85 wt.%, more preferably 83 to 84 wt.%, based on a total weight of the asphaltenes. In some embodiments, the asphaltenes comprise 60 to 70 wt.% aliphatic carbon atoms, preferably 62 to 67 wt.%, more preferably 63 to 65 wt.% aliphatic carbon atoms, based on a total weight of the carbon atoms present in asphaltenes. In some embodiments, the asphaltenes comprise 30 to 40 wt.% aromatic carbon atoms, preferably 32 to 38 wt.%, more preferably 35 to 37 wt.% aromatic carbon atoms, based on the total weight of the carbon atoms present in asphaltenes. Preferred asphaltenes also include hydrogen atoms in an amount ranging from 6.2 to 10 wt.%, preferably 8.0 to 9.0 wt.%, more preferably 8.2 to 8.4 wt.%, based on the total weight of asphaltenes. In some embodiments, 90 to 95 wt.%, preferably 90.5 to 94 wt.%, more preferably 91 to 92 wt.% of hydrogen atoms are attached to aliphatic carbons, based on a total weight of hydrogen atoms present in asphaltenes. In some embodiments, 5 to 10 wt.%, preferably 6 to 9.5 wt.%, more preferably 8 to 9 wt.% of hydrogen atoms attached to aromatic carbons, based on the total weight of hydrogen atoms present in the asphaltenes. In some embodiments, the asphaltenes has a ratio of aliphatic carbons to aromatic carbons of 1.5:1 to 3:1, preferably 1.6:1 to 2:1, preferably 1.7:1 to 1.8:1. In some embodiments, the asphaltenes have and a ratio of aliphatic hydrogens to aromatic hydrogens of 8:1 to 14:1, preferably 9:1 to 13:1, preferably, 10:1 to 12:1, most preferably about 11:1.

Asphaltenes frequently comprise metals which are either present in the parent crude oil from which the asphaltenes are derived, or which are introduced inadvertently or purposefully during such processing. In some embodiments, the asphaltenes have a nickel content ranging from 10 to 30 ppm, preferably 15 to 25 ppm, more preferably 18 to 20 ppm, based on a total weight of the asphaltene. In some embodiments, the asphaltenes have a vanadium content ranging from 30 to 60 ppm, preferably 40 to 57.5 ppm, more preferably 50 to 55 ppm, based on a total weight of the asphaltene. The metals, such as vanadium and nickel, may occupy either heteroatoms (N, S, and O) bonded sites or may be strongly associated with the aromatic sheets of asphaltenes via $\pi$-$\pi$ bonding in metalloporphyrin.

In some embodiments, the asphaltenes have an average molecular weight (Mw), determined by gel permeation chromatography, ranging from 1700 to 2000, preferably 1750 to 1950, and more preferably 1800 to 1900 g/mol.

As described above, asphaltenes typically consist of highly condensed polyaromatic rings bearing long aliphatic and alicyclic substituents with metals and heteroatoms as part of a ring system. On functionalization of asphaltene with nitric acid, the aliphatic chains, and some naphthenic rings break down. These components may also develop various functional groups, particularly oxygen-containing functional groups, such as –COOH, –C=O, C–O, and other oxygen functional groups. Such functional groups may play critical roles in changing the solubility properties and chemical interactions with other materials, particularly with the PVC polymer.

In some embodiments, the asphaltene is an acid-functionalized asphaltene, including oxygen-containing functional groups. The oxygen-containing functional groups include at least one selected from the group consisting of nitro, carbonyl, and carboxyl groups. In general, the acid-functionalized asphaltenes may be prepared by any suitable acid treatment method known to one of ordinary skill in the art. The acid may be any suitable acid, examples of which include, but are not limited to hydrochloric acid, hydrobromic acid, hydroiodic acid, chloric acid, perchloric acid, sulfuric acid, phosphoric acid, nitric acid, formic acid, acetic acid, and mixtures thereof. In preferred embodiments, the acid-functionalized asphaltenes are prepared with nitric acid. In some embodiments, the nitric acid has a concentration of 50 to 90%, preferably 70%.

Composite

In some embodiments, the composite comprises the PVC polymer in an amount ranging from about 90 to 99.5 wt.% preferably 90.25 to 99 wt.%, preferably 90.5 to 98%, preferably 91 to 97 wt.%, preferably 92 to 96 wt.%, preferably 92.5 to 95 wt.%, and a filler in an amount less than 10 wt.%, preferably less than 9 wt.%, preferably less than 8 wt.%, preferably less than 7 wt.%, preferably less than 6 wt.%, preferably less than 5 wt.%, wherein the filler is an asphaltene, and the weight percentages are based on a total weight of the composite. In some embodiments, the composite consists essentially of the PVC polymer in an amount ranging from about 90 to 99.5 wt.% preferably 90.25 to 99 wt.%, preferably 90.5 to 98%, preferably 91 to 97 wt.%, preferably 92 to 96 wt.%, preferably 92.5 to 95 wt.%, and a filler in an amount less than 10 wt.%, preferably less than 9 wt.%, preferably less than 8 wt.%, preferably less than 7 wt.%, preferably less than 6 wt.%, preferably less than 5 wt.%, wherein the filler is an asphaltene, and the weight percentages are based on a total weight of the composite. In some embodiments, the composite consists of the PVC polymer in an amount ranging from about 90 to 99.5 wt.% preferably 90.25 to 99 wt.%, preferably 90.5 to 98%, preferably 91 to 97 wt.%, preferably 92 to 96 wt.%, preferably 92.5 to 95 wt.%, and a filler in an amount less than 10 wt.%, preferably less than 9 wt.%, preferably less than 8 wt.%, preferably less than 7 wt.%, preferably less than 6 wt.%, preferably less than 5 wt.%, wherein the filler is an asphaltene, and the weight percentages are based on a total weight of the composite. In a preferred embodiment, asphaltene is the only filler present. In some embodiments, the asphaltene is present in an amount less than 10 wt.% of the total weight of the composite, preferably 0.25 wt.% to 7.5 wt.%, more preferably 0.5 wt.% to 5 wt.%, based on the total weight of the polyvinyl chloride-asphaltene composite. In some embodiments, unfunctionalized asphaltenes as described above are used. In some embodiments, acid-functionalized asphaltenes as described above are used.

In some embodiments, the asphaltenes are present as isolated molecular species. That is, the asphaltenes are not present in the form of clusters, aggregates, agglomerates, or other collections of individual asphaltene molecules. Such agglomerates may be considered to be phase separated from the PVC polymer. In some embodiments, the asphaltenes are present as small agglomerates, comprising 2 to 6 monomers per agglomerate. Such small agglomerates may have sizes which are less than 2.5 µm, preferably less than 2.0 µm, preferably less than 1.5 µm, preferably less than 1.25 µm, preferably less than 1.0 µm. In some embodiments, the asphaltenes are present as large agglomerates, comprising 7 to 25 monomers per agglomerate. Such large agglomerates may have sizes which are 2.5 to less than 15 µm, preferably 2.6 to 14 µm, preferably 2.75 to 12.5 µm. In some embodiments, the agglomerates have an average molecular weight of 5,000 to 100,000 g/mol, preferably 10,000 to 75,000 g/mol, preferably 20,000 to 50,000 g/mol agglomerate.

The PVC polymer may interact with the filler via covalent or electrostatic forces. In some embodiments, the PVC polymer interacts with the filler with van der Waals forces. The asphaltenes may be physically dispersed (i.e., no chemical reactions between the asphaltenes and the polymer) within that PVC matrix, chemically reacted with the PVC or a combination of both. Preferably, the asphaltenes are homogeneously dispersed within the polymer matrix and may disrupt intermolecular interactions between polymer chains. The asphaltenes contain hydrocarbon chains that may interact with the C-C backbone of PVC or the methyls of PVC via van der Waals interactions.

In some embodiments, the composite is in the form of a particle. Particle may have any suitable shape, examples of which include, but are not limited to a sphere, a spheroid, a cube, a cuboid, a rod, a fiber, a flake, a plate, and a polygon. Preferably, the particle has an irregular shape and a largest average diameter ranging from 0.1 to 5 µm, preferably 0.15 to 4 µm, preferably 0.2 to 2.5 µm, and more preferably 0.25 to 1 µm. For particles with a polygonal shape, the term "diameter," as used herein and unless otherwise specified, refers to the most significant possible distance measured from a vertex of a polygon through the center of the face to the vertex on the opposite side. For spheres, spheroids, and irregular-shaped particles, "diameter" refers to the most significant distance measured from one point on the particle through the center of the particle to an end directly across from it.

In some embodiments, the composite has a thermal degradation at 50% conversion, $T_{50\%}$, which is 5 to 25° C., preferably 6 to 24° C., preferably 7 to 23° C., preferably 8 to 22° C., preferably 9 to 21° C., preferably 10 to 20° C. higher than a polyvinyl chloride devoid of the asphaltene, a thermal degradation onset, $T_{2\%}$, which is 5 to 25° C., preferably 6 to 24° C., preferably 7 to 23° C., preferably 8 to 22° C., preferably 9 to 21° C., preferably 10 to 20° C. higher than a polyvinyl chloride devoid of the asphaltene, or both, as determined by thermogravimetric analysis.

In some embodiments, the composite has a tensile strength in the range of 68.5 to 80 MPa, preferably 69 to 79 MPa, preferably 70 to 78 MPa, preferably 70.5 to 77.5 MPa. In some embodiments, the composite has an elastic modulus ranging from 1650 to 1933 Mpa, more preferably 1675 to 1900, preferably 1700 to 1800, preferably 1725 to 1775 Mpa. The elastic modulus may be determined or measured by any suitable technique, such as by ASTM standard D638-02a. In some embodiments, the composite has a yield strength of 30 to 75 MPa, preferably 35 to 68 MPa, preferably 37.25 to 66.5 MPa. In some embodiments, the composite has a max load of 315 to 355 N, preferably 320 to 351 N. In some embodiments, the composite has an elongation at break of 5 to 75%, preferably 10 to 70%, preferably 15 to 65%, preferably 20 to 61%.

In some embodiments, the asphaltenes are functionalized asphaltenes and the composite has a tensile strength in the range of 57.5 to 72.5 MPa, preferably 59 to 72 MPa, preferably 59.5 to 71.5 MPa, preferably 60 to 71.1 MPa. In some embodiments, the asphaltenes are functionalized asphaltenes and the composite has an elastic modulus ranging from 1500 to 1925 Mpa, more preferably 1675 to 1910, preferably 1750 to 1900, preferably 1825 to 1890 Mpa. The elastic modulus may be determined or measured by any suitable technique, such as by ASTM standard D638-02a. In some embodiments, the asphaltenes are functionalized asphaltenes and the composite has a yield strength of 30 to 70 MPa, preferably 35 to 65 MPa, preferably 38.1 to 60 MPa. In some embodiments, the asphaltenes are functionalized asphaltenes and the composite has a max load of 275 to 330 N, preferably 278 to 325 N. In some embodiments, the composite has an elongation at break of 5 to 40%, preferably 10 to 37.5%, preferably 15 to 30%, preferably 20 to 27.5%.

In some embodiments, the composites may optionally include other ingredients such as fillers (other than asphaltenes), polymerization catalysts and by-products of polymerization catalysts (e.g., catalyst used during the polymerization reaction that remains in the polymer or the remains of radical initiators), plasticizers, process aids, accelerators, modifiers, processing oils, pigments and dyes, and mixtures thereof. Such ingredients, when present, may be included in the composite in amounts up to 10 wt.%, preferably up to 5 wt.%, preferably up to 3 wt.%, preferably up to 1 wt.%, preferably up to 0.5 wt.%, relative to the total weight of the PVC-asphaltene composite.

Non-limiting examples of fillers (other than asphaltenes) that can be included in the composite material herein include, but are not limited to, natural fibers (e.g., cellulose, lignocellulose, lignin); glass fibers (e.g., milled glass fiber); keratin feather fiber; metallic fibers (e.g., carbon fibers, silicon fibers); inorganic oxides (e.g. aluminum oxide, zirconia, titania, iron oxide, magnesium oxide, calcium oxide, silica, quartz); inorganic hydroxides (e.g., hydrotalcite); metal nitrides (e.g., silicon nitride); inorganic salts (e.g. calcium carbonate, silicon carbonate); silicates such as those based on the oxides of lithium, calcium, barium, strontium, magnesium, aluminum, sodium, potassium, cerium, tin, strontium, boron, lead, and mixtures thereof (e.g. talc, kaolin, montmorillonite); metals (e.g., silver); carbonaceous materials (e.g., graphene oxide, carbon nanotubes, graphene, including modified carbonaceous materials such as L-aspartic acid functionalized carbonaceous materials, graphite powder, carbon powder); silica (e.g. silicalites, zeolites, fumed silica powder); asphalt and asphalt powder.

Non-limiting examples of polymerization catalysts include Ziegler-Natta catalysts, titanium oxide residues, chromium on silica catalysts, metallocenes, and by-products of these polymerization catalysts.

Non-limiting examples of plasticizers include phthalates, trimellitates, adipates, sebacates, maleates, benzoates, terephthalates, sulfonamides, organophospahtes, and polyethers. Specific examples include, but are not limited to, bis(2-ethylhexyl) phthalate DEHP), diisononyl phthalate (DINP), di-n-butyl phthalate (DnBP, DBP), butyl benzyl phthalate (BBzP), diisodecyl phthalate (DIDP), dioctyl phthalate, o-nitrophenyloctylether, trimethyl trimellitate (TMTM), tri-(2-ethylhexyl) trimellitate (TEHTM-MG), tri-(n-octyl,n-decyl) trimellitate (ATM), tri-(heptyl,nonyl) trimellitate (LTM), n-octyl trimellitate (OTM), bis(2-ethylhexyl)adipate (DEHA), dimethyl adipate (DMAD), monomethyl adipate (MMAD), dioctyl adipate (DOA), dibutyl sebacate (DBS), dibutyl maleate (DBM), diisobutyl maleate (DIBM), dioctyl terephthalate, 1,2-cyclohexane dicarboxylic acid diisononyl ester, alkyl sulphonic acid phenyl ester (ASE), N-ethyl toluene sulfonamide (o/p ETSA), N-(2-hydroxypropyl) benzene sulfonamide (HP BSA), N-(n-butyl) benzene sulfonamide (BBSA-NBBS), tricresyl phosphate (TCP), tributyl phosphate (TBP), and triethylene glycol dihexanoate.

Polymer processing aids maybe those fluoropolymers generally recognized in the melt processing field as being capable of improving the melt processability of polymers. The fluoropolymers may be thermoplastic or elastomeric materials. Preferred fluoropolymers include homopolymers or copolymers derived from vinylidene difluoride, hexafluoropropylene, and tetrafluoroethylene monomers. Other conventional polymer processing additives may be included with the fluoropolymer to impart specific functional features.

Accelerators may include transition metal salts based on iron, cobalt, manganese, cerium, copper, or nickel and photosensitizes like anthraquinone or benzophenone derivatives.

Modifiers may include ionomers, ethylene/butene/1,9-decadiene copolymers, dendritic polyethylene, or any other modifier known by those of ordinary skill in the art, such as those described in U.S. Pat. No. 7,943,700—incorporated herein by reference in its entirety.

Suitable processing oils may include paraffin-type mineral oils; commercially available examples of suitable processing oils include Paralux processing oil and Hydrobrite processing oil, respectively commercially available from Chevron and Crompton.

Exemplary pigments and dyes may include, but is not limited to, indigo, molecular derivatives of indigo, thioindigos, molecular derivatives of thioindigo, anthraquinones, anthrathrones, anthrapyrimidines, monoazos, diazos, azomethines, quinacridones, quinophthalones, diketopyrrolopyrrols, inanthrones, isoindolines, perylenes, perinones, phthalocyanines, pyranthrones, pyrazolo-quinazolones, diphenylmethanes, acridines, xanthenes, triarylmethanes, thiazines, indophenols, indulines, nigrosines, aminoazobenzenes, anilines, benzimidazoles, benzopyrans, quinolines, aminoketones, alizarins, naphthalimides, acridones, anthracenediones, anthrathioxanthenones, carmine, beta carotene, carmine hydrosoluble, turmeric, beet, annato, metal complex dyes, metal complex pigments, azo/metal complexes, a rutile pigment, a spinel pigment, a bismuth vanadate pigment, a cerium sulfide pigment, and combinations thereof.

In most preferred embodiments, the PVC-asphaltene composite is substantially free of fillers (other than asphaltenes), polymerization catalysts, plasticizers, process aids, accelerators, modifiers, processing oils, and/or pigments and dyes. In most preferred embodiments, the PVC-asphaltene composite consists essentially of or consists of the PVC polymer and the asphaltene.

Method of preparing the polyvinyl chloride-asphaltene composite

Referring to FIG. 1, a flow chart of a method 100 of preparing the polyvinyl chloride-asphaltene composite is illustrated. The order in which the method 100 is described is not intended to be construed as a limitation, and any number of the described method steps can be combined in any order to implement the method 100. Additionally, individual steps may be removed or skipped from the method 100 without departing from the spirit and scope of the present disclosure.

At step 102, the method 100 includes ultrasonically treating the asphaltene and a first organic solvent to form an asphaltene solution. In some embodiments, the asphaltene is derived from Arabian medium crude oil, and the asphaltene has a composition as described above. The solvent may be any suitable solvent for asphaltene, for example carbon tetrachloride, THF, carbon disulfide, or mixtures thereof. In some embodiments, the first organic solvent is THF. In some embodiments, the asphaltene is an acid functionalized asphaltene, including oxygen-containing functional groups. The oxygen-containing functional groups are at least one selected from the group consisting of nitro groups, carbonyl groups, and carboxyl groups. In an embodiment, the acid-functionalized asphaltene was prepared by treating asphaltene with nitric acid having a concentration of 50 to 90%, preferably 60 to 80%, preferably 70% in water.

At step 104, the method 100 includes dispersing PVC polymer in a second organic solvent to form a PVC solution. In some embodiments, the second organic solvent is THF. In some embodiments, the PVC polymer has a density of 1.10 to 1.45 g/cm$^3$, and an average molecular weight of 20,000 to 105,000 g/mol, as described above.

At step 106, the method 100 includes mixing the asphaltene solution and the PVC solution to form a casting mixture.

At step 108, the method 100 includes removing the first organic solvent and the second organic solvent to form the polyvinyl chloride-asphaltene composite. In an embodiment, the first organic solvent and the second organic solvent are removed by heating or drying.

More non-limiting examples of processes for forming and shaping the composite may be employed and include extrusion molding, rotational molding, compression molding, injection molding, casting, and thermoforming.

Following formation, the composite may be manipulated/manufactured to have any desired shape. For example, the composite may be manufactured to be in the form of sheets, particles, granules, extrudates, lumps, spheres, spheroids, cubes, cuboids, rods, fibers, flakes, plates, tubes or other hollow shapes, polygons, pipes, hose, wire, cable or any other desirable shape. For example, the composite may be extruded, molded, compressed, casted, cooled, solidified, etc. to have any desirable shape.

In some embodiments, the composite is extruded by forcing the composite through a particular cross section in an extruder and the resulting extrudate can be cooled to produce the desired shape. In some embodiments, an injection molding process is performed, whereby the composite is forced into a cold, closed mold cavity by means of high pressure applied hydraulically through a ram or screw type plunger. The composite is then solidified in the cool mold to form the composite material into a desired shape.

In some embodiments, the composite is shaped using rotational molding (rotomolding) whereby the composite is heated in a mold in an oven, then the mold is removed from the oven with biaxial rotation, and the mold and its contents are cooled with water or air. Once the composite has cooled, the mold can be opened and the product removed.

In some embodiments, the composite may be processed using compression molding, such as hot pressing, whereby the composite is placed between stationary and movable molds. Once the mold is closed, heat and pressure may be applied to obtain a homogeneously shaped composite. After cooling, the composite may be trimmed, smoothed, painted and/or electroplated as needed for a particular use.

It is also envisioned that the PVC-asphaltene composite may be produced by in situ polymerization method, whereby vinyl chloride is polymerized in the presence of asphaltenes and a polymerization catalyst or initiator to evenly distribute the asphaltene as the polyvinyl chloride chain grows.

The examples below are intended to further illustrate protocols for preparing and characterizing the composite described above and are not intended to limit the scope of the claims.

Where a numerical limit or range is stated herein, the endpoints are included. Also, all values and subranges within a numerical limit or range are specifically included as if explicitly written out.

Obviously, numerous modifications and variations of the present invention are possible in light of the above teachings. It is therefore to be understood that, within the scope of the appended claims, the invention may be practiced otherwise than as specifically described herein.

EXAMPLES

Materials and methods

Figure 2:
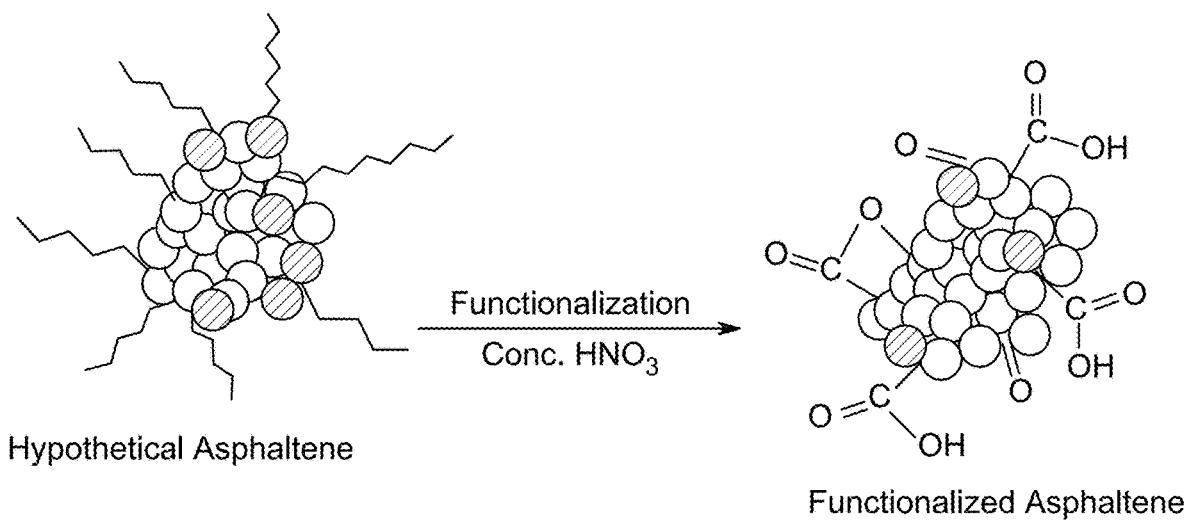
FIG. 2 illustrates a method of making a functionalized asphaltene from asphaltene, according to certain embodiments.

Commercial grade PVC was procured from Saudi Arabia Basic Industries Corporation (SABIC®), Riyadh, Saudi Arabia. The PVC had the following properties: density of 1.38 g/cm$^3$, a melt index of 2.60, tensile strength of 70, and an average molecular weight of 30,000-95,000 Da. The asphaltenes were isolated from the Arab Medium (AM) crude of Saudi Arabia using n-heptane and were functionalized using a 70% $HNO_3$ solution (FIG. 2).

Figure 3A:
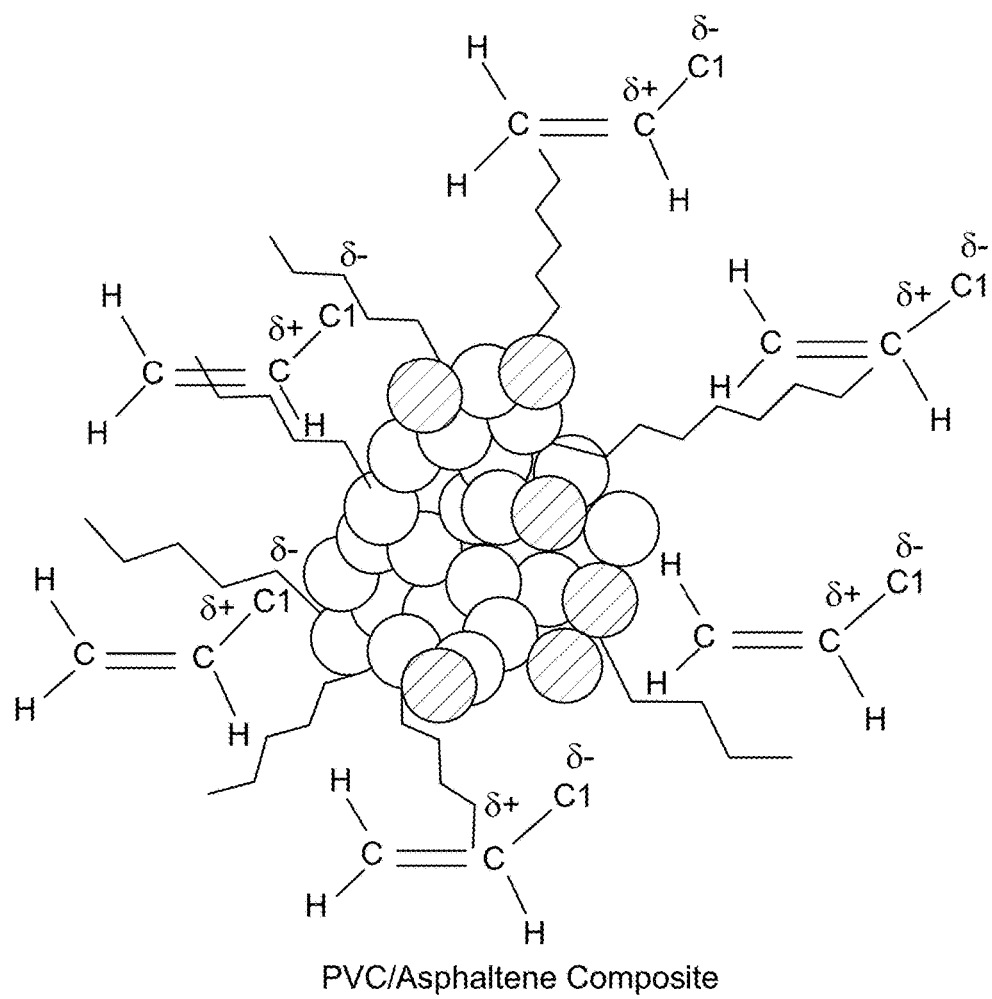
FIGS. 3A and 3B illustrate structures of the PVC/asphaltene composite and a PVC/functionalized asphaltene composite, according to certain embodiments.
Figure 3B:
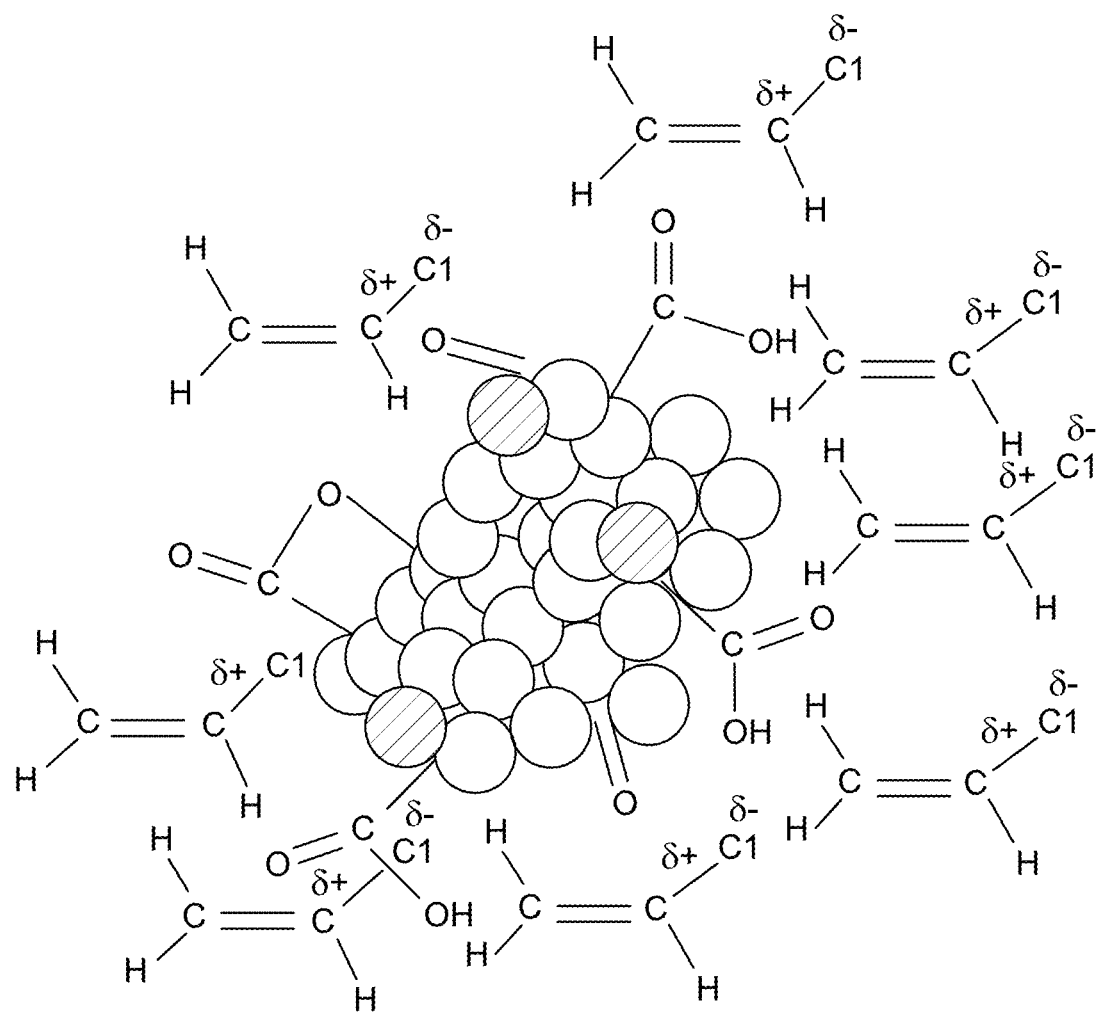

Preparation of the PVC/asphaltene composite and the functionalized asphaltene composite A required amount of asphaltene and functionalized asphaltene, taken separately, were completely dissolved in tetrahydrofuran (THF) solvent and sonicated for 30 minutes. Further, a desired amount of PVC was also dissolved in the THF. The ratio of asphaltene and functionalized asphaltene is given in Table 1. Additionally, the PVC/asphaltene composite and the PVC/functionalized asphaltene solutions were thoroughly mixed using a magnetic stirrer for 24 h to form a homogenous solution mixture. The resulting solution mixture was poured into the desired container having a fixed area. It was dried at room temperature in a fume hood to allow for evaporation of the THF. A series of composite sheets were prepared at different weight ratios of PVC and fillers (asphaltene and functionalized asphaltene). The different weight ratios and a sample IDs are shown in Table 1. The structures of the PVC/asphaltene composite and the PVC/functionalized asphaltene composite are shown in the FIGS. 3A and 3B, respectively.

TABLE 1

Relative amounts of PVC with asphaltenes and functionalized asphaltenes.

| PVC/Fillers (wt. %) | PVC/asphaltenes | PVC/functionalized asphaltene |
|---|---|---|
| 0:100 | AM-A | AM-FA |
| 100:0 | PVC | PVC |
| 99.5:0.5 | PVC-A 0.5% | PVC-FA 0.5% |
| 99:1 | PVC-A 1% | PVC-FA 1% |
| 98:2 | PVC-A 2% | PVC-FA 2% |
| 95:5 | PVC-A 5% | PVC-FA 5% |

Characterization

For the characterization of the chemical structure of the PVC and its composites, FT-IR spectroscopy was used. The instrument used was an FT-IR spectrophotometer of Perkin-Elmer, Spectrum One. The resolution of the equipment was 4 $cm^{-1}$, the recorded wavenumber range was from 450 to 4000 per centimeter ($cm^{-1}$), and 32 spectra were averaged to reduce the noise. To determine the thermal stability of the composites, thermal gravimetric analysis (TGA) was performed on a Pyris 1 TGA (Perkin Elmer) thermal analyzer equipped with a sample pan made of platinum samples of about 5-8 mg. The samples were heated from ambient temperature to 600° C. at a 10° C/min heating rate under a 20 ml/min nitrogen flow. Scanning electron microscopy (SEM) for the morphology was obtained using FESEM/FIB/GIS (Tescan Lyra-3, Brno—Kohoutovice, Czech Republic) operated at 20.0 kilovolt (kV). The tensile mechanical properties were studied on relatively thin films of the polymer or composites. Dumbbell-shaped tensile-test specimens (central portions, 5×0.5 mm thick, gauge length 22 mm) were cut from the sheets in a Wallace cutting press and conditioned at 23° C. and 55-60% relative humidity for 48 h. The stress-strain data were obtained with an Instron model BlueHill 2 tensile-testing machine, maintained under the same conditions, and operated at an extension rate of 5 mm/min. The yield stress, tensile strength, and elongation at break values were determined according to ASTM D 1708-66. Five specimens were tested for each sample, and the average values were reported.

FT-IR spectra

Figure 4A:
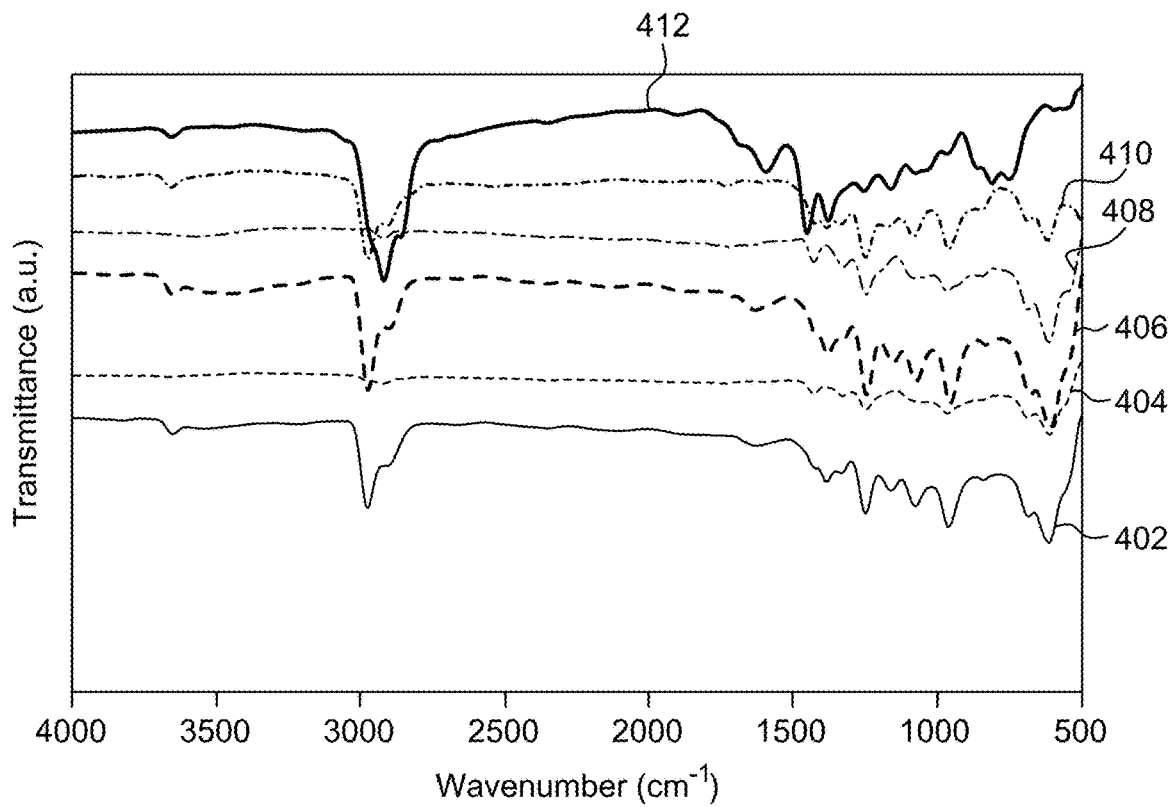
FIG. 4A illustrates Fourier transform infrared (FT-IR) spectra of PVC, asphaltene, and the PVC/asphaltene composites with different weight percentages of asphaltenes, according to certain embodiments.
Figure 4B:
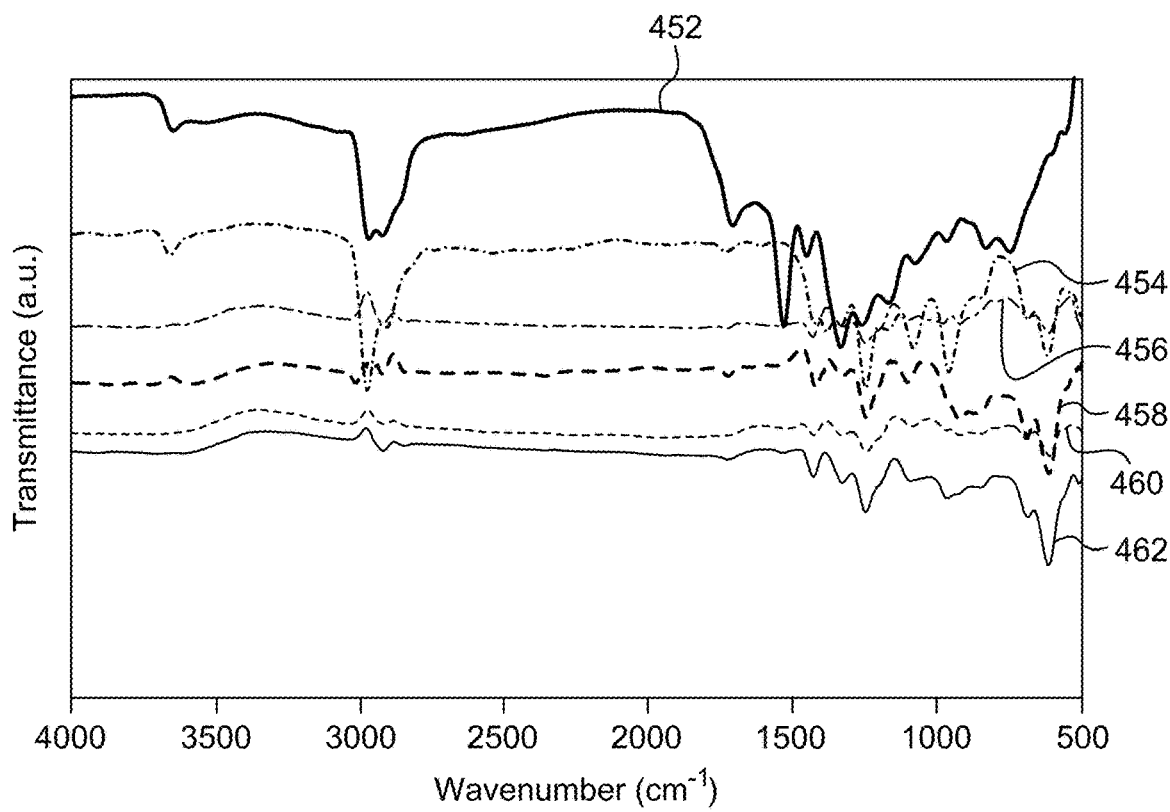
FIG. 4B illustrates FT-IR spectra of PVC, functionalized asphaltene, and the PVC/functionalized asphaltene composites with different weight percentages of functionalized asphaltenes, according to certain embodiments.
Figure 5A:
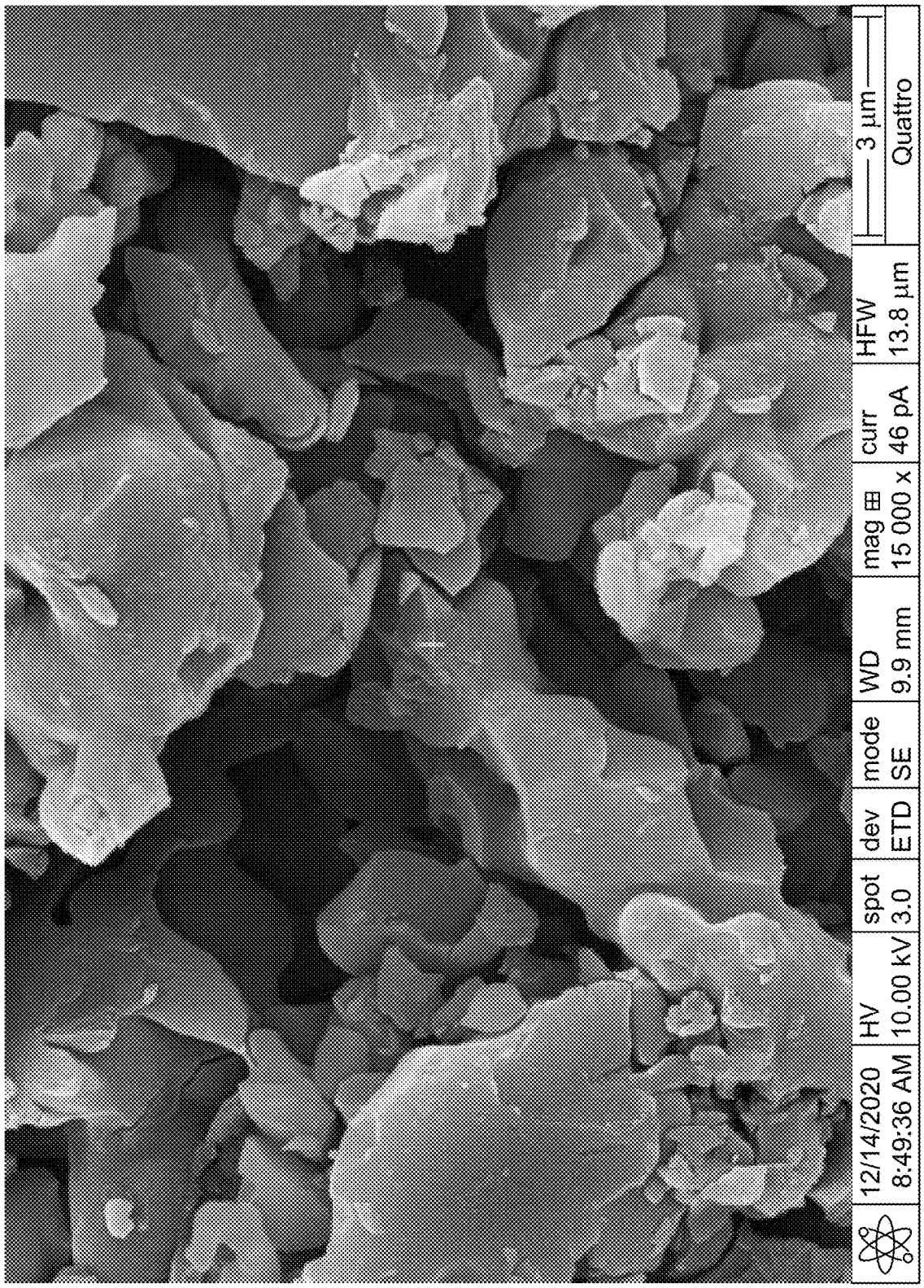
FIG. 5A illustrates a scanning electron microscopic (SEM) image of asphaltene, according to certain embodiments.
Figure 5B:
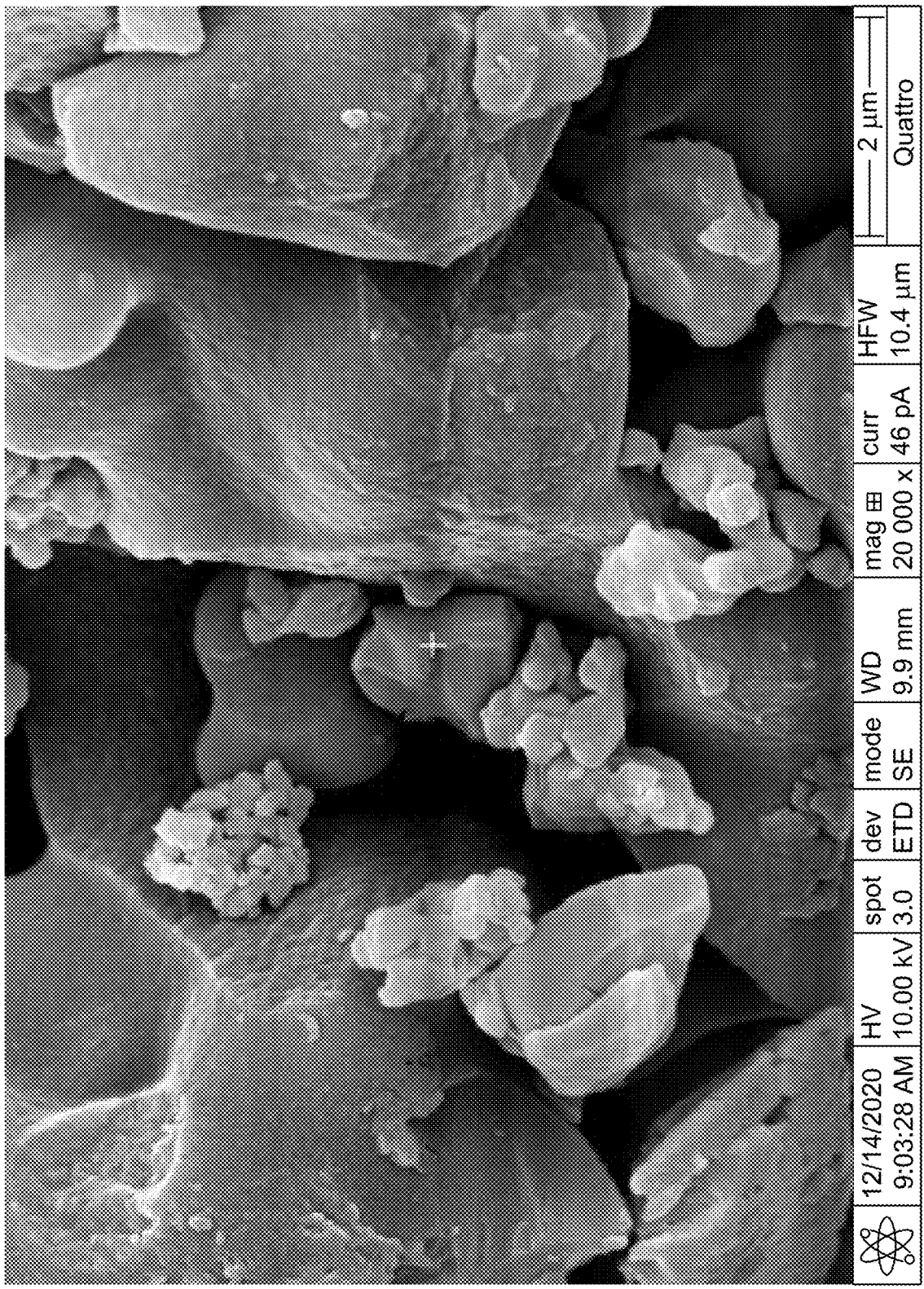
FIG. 5B illustrates a SEM image of the functionalized asphaltene, according to certain embodiments.
Figure 5C:
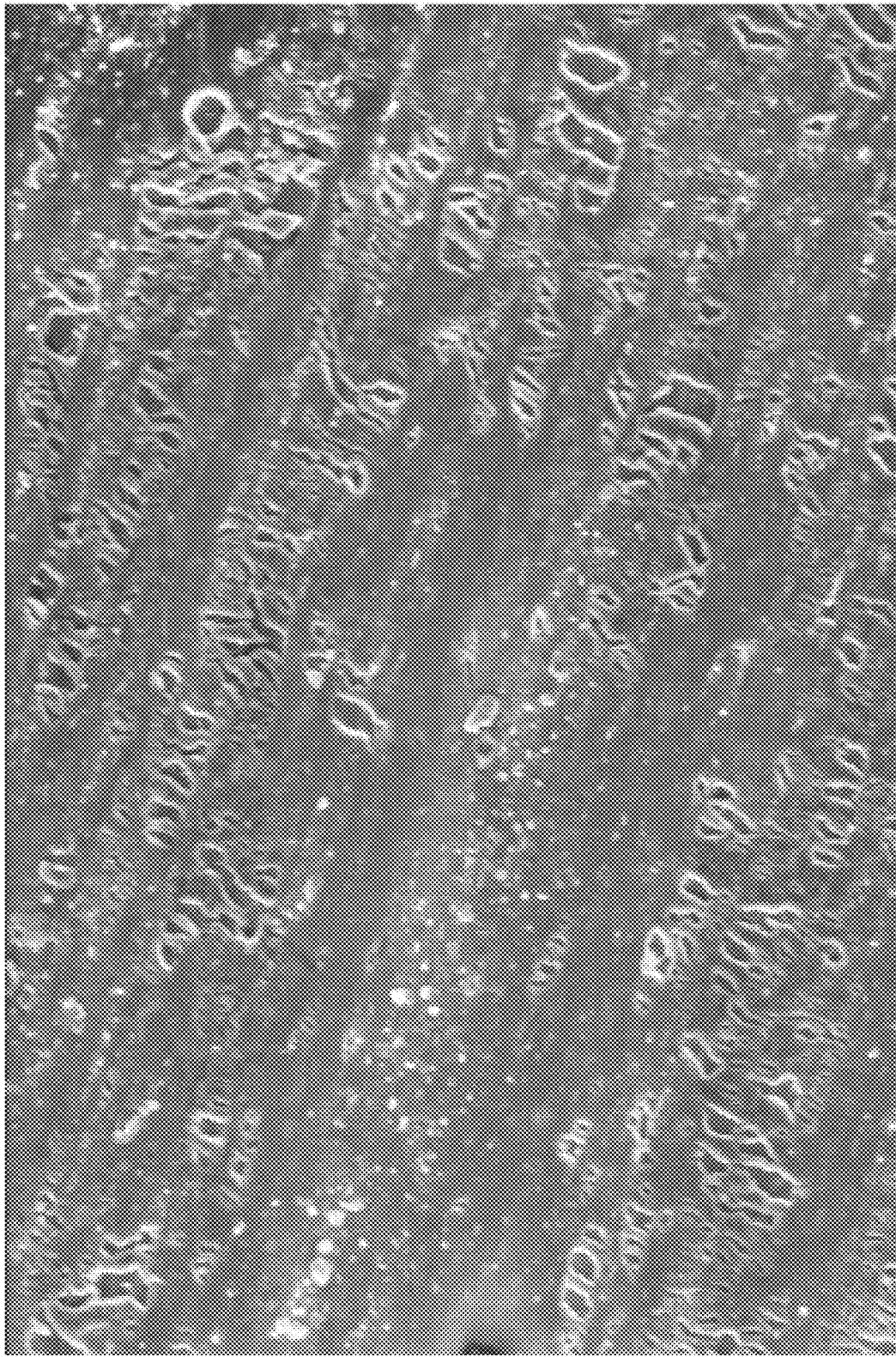
FIG. 5C illustrates a SEM image of PVC, according to certain embodiments.
Figure 5D:
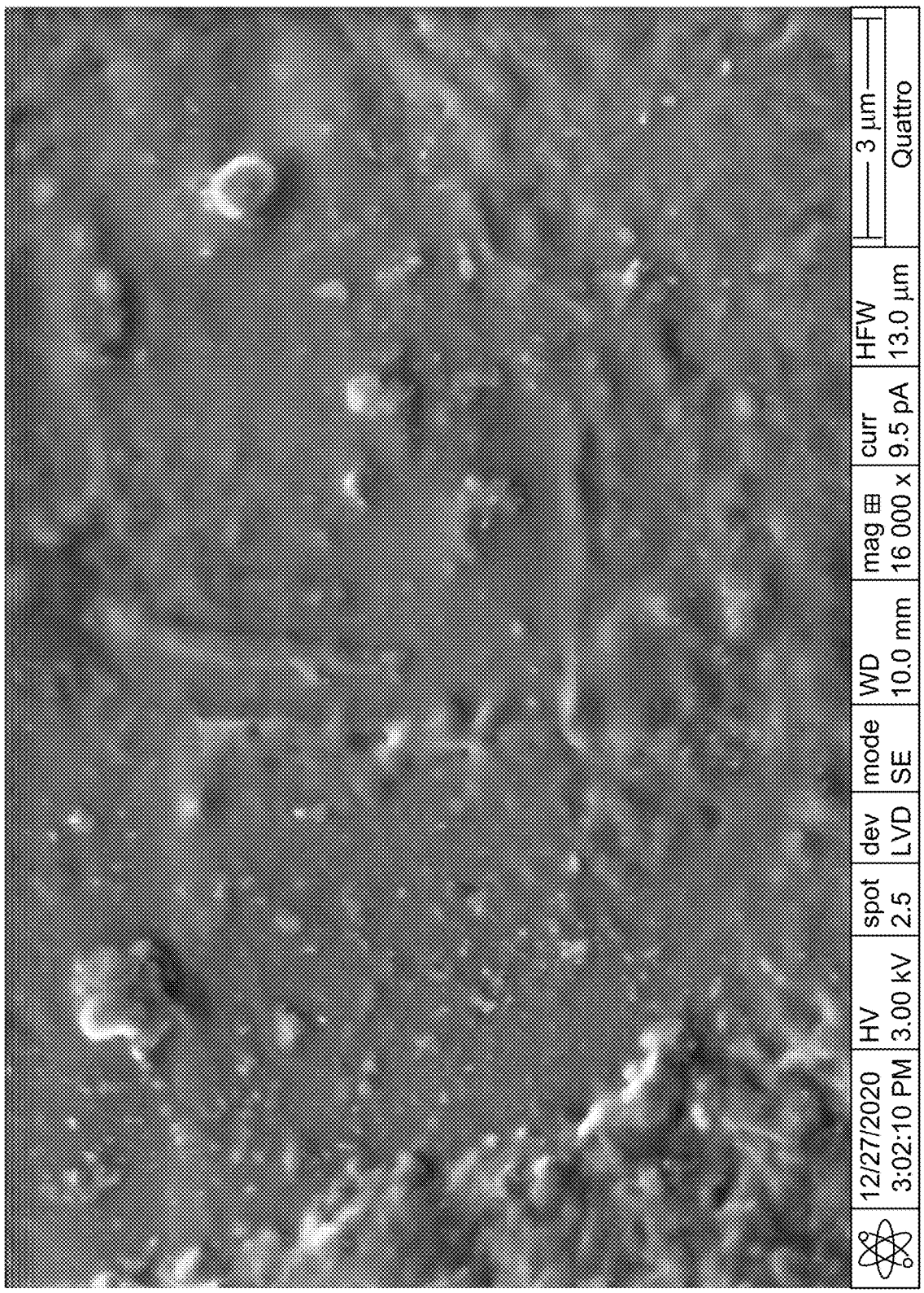
FIGS. 5D-5G illustrate SEM images of the PVC/asphaltene composite with 0.5%, 1%, 2%, and 5% of asphaltene, respectively, according to certain embodiments.
Figure 5E:
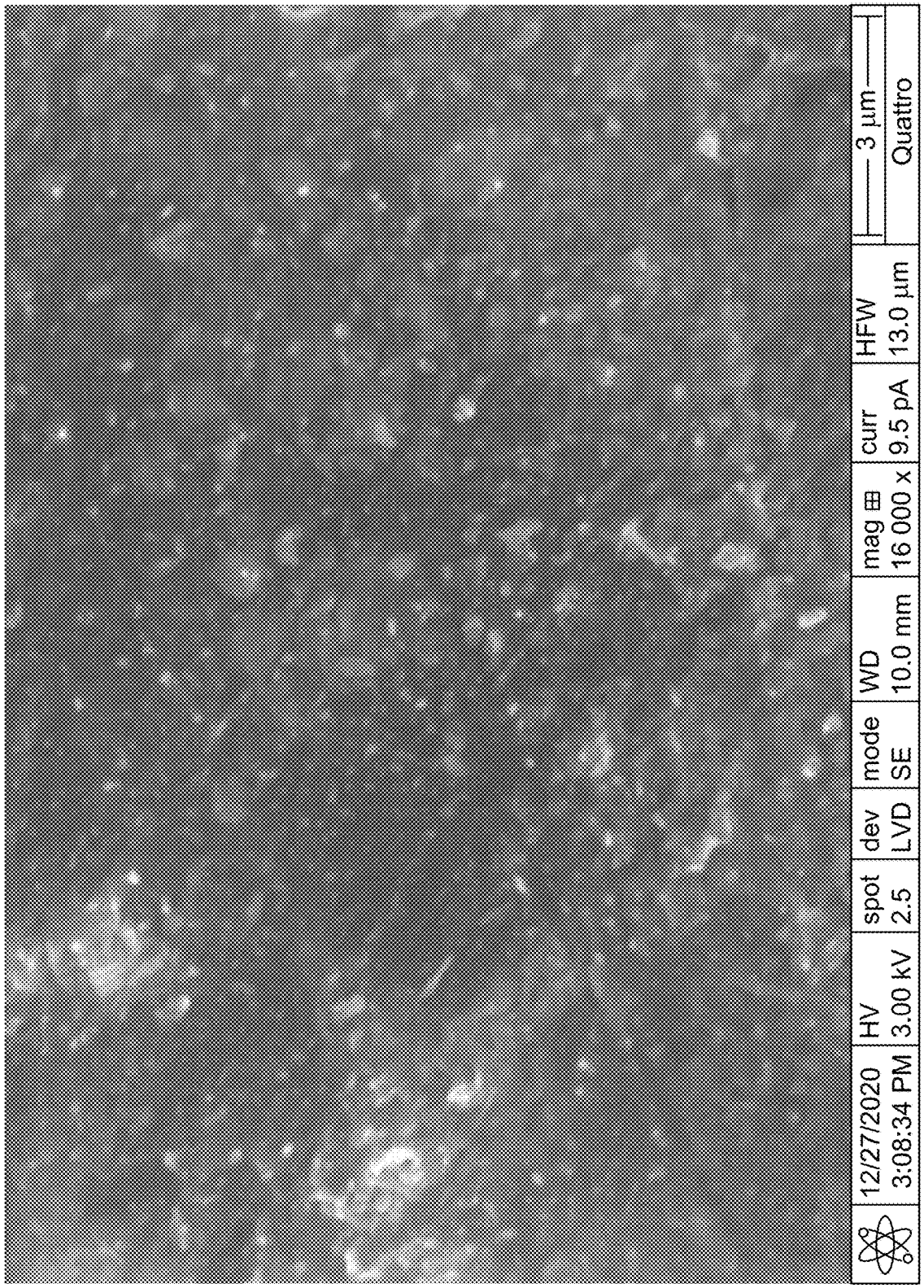
Figure 5F:
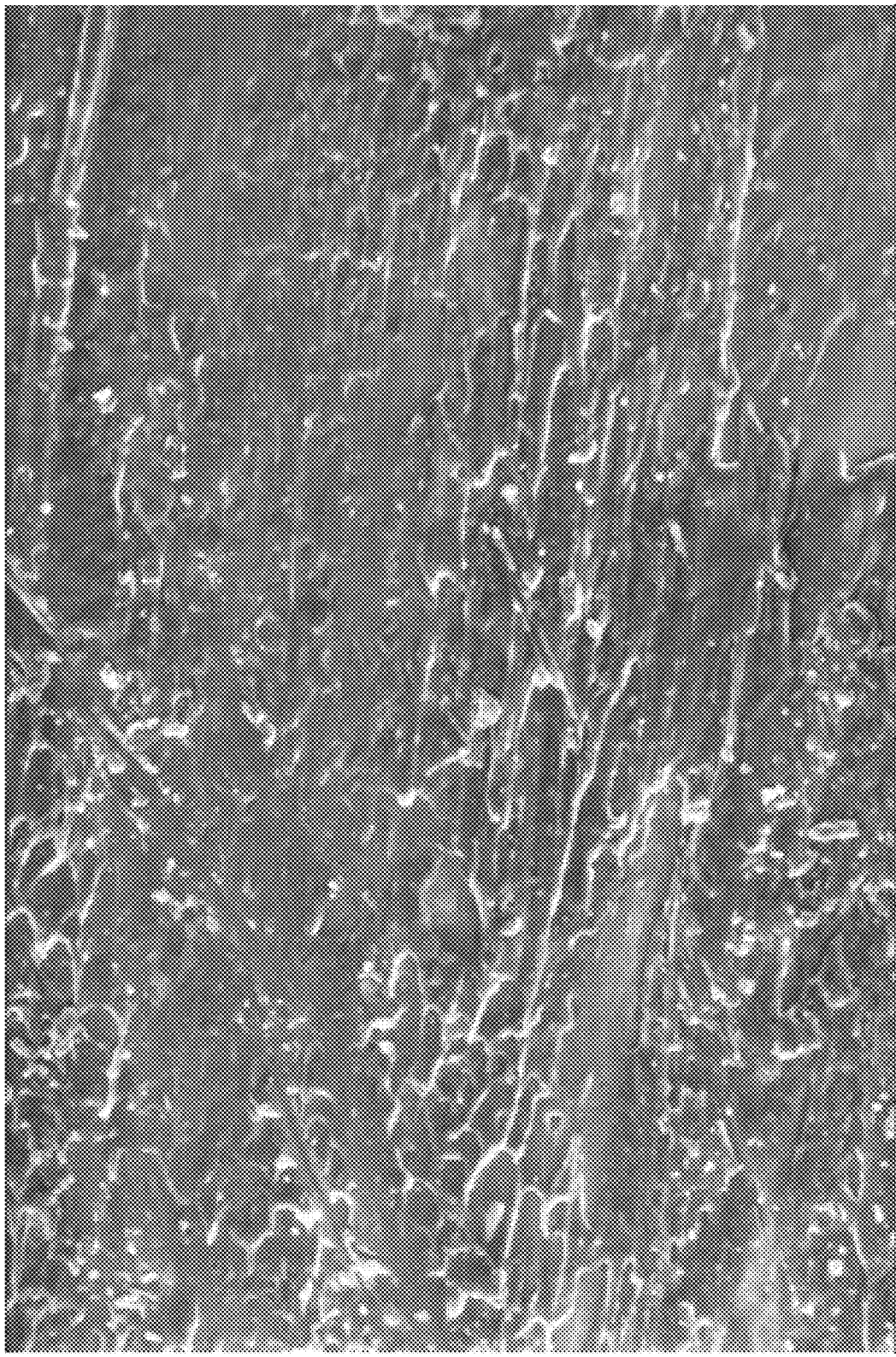
Figure 5G:
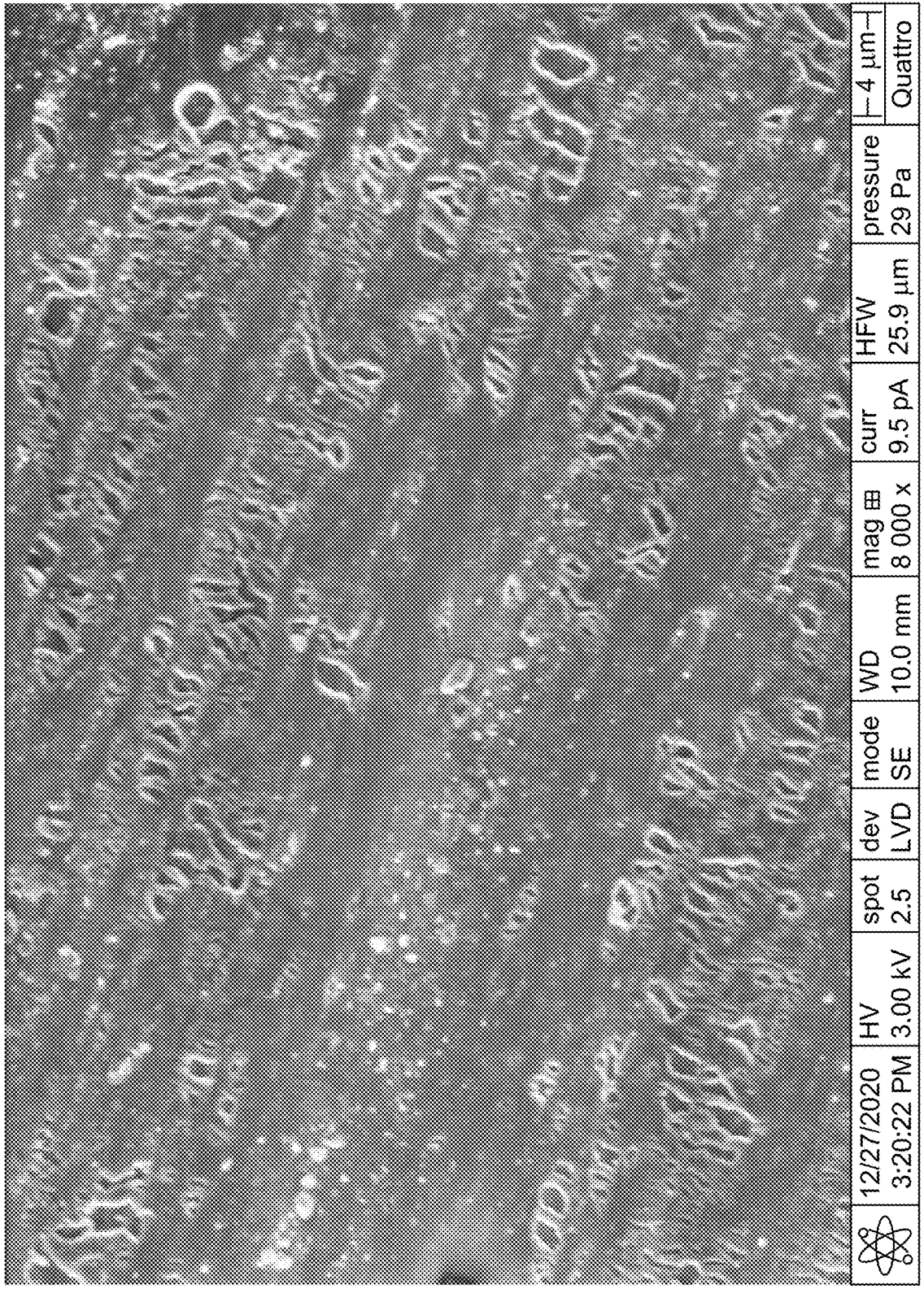
Figure 5H:
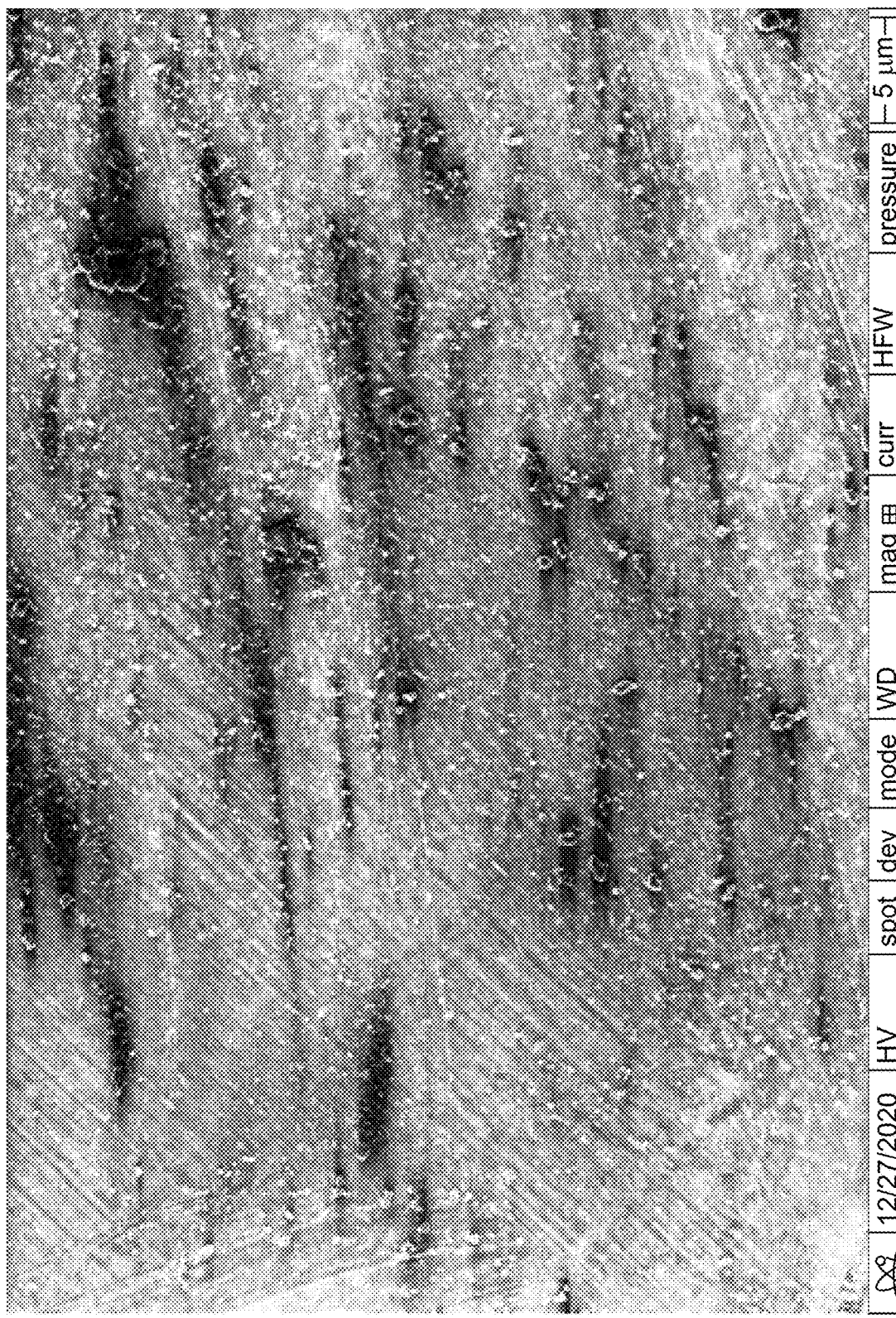
FIGS. 5H-5K illustrate SEM images of the PVC/functionalized asphaltene composite with 0.5%, 1%, 2%, and 5% of functionalized asphaltene, respectively, according to certain embodiments.
Figure 5I:
Figure 5J:
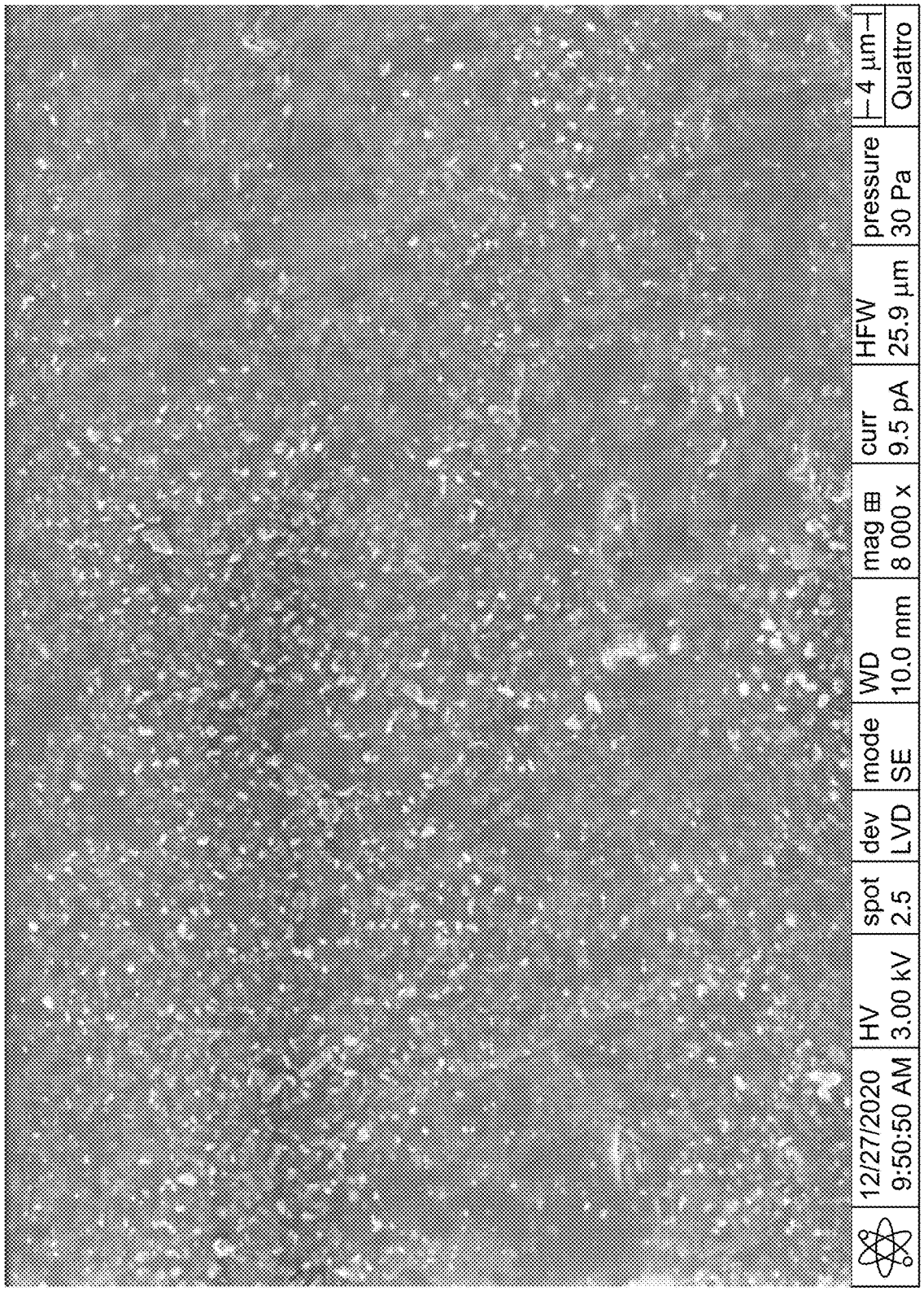
Figure 5K:
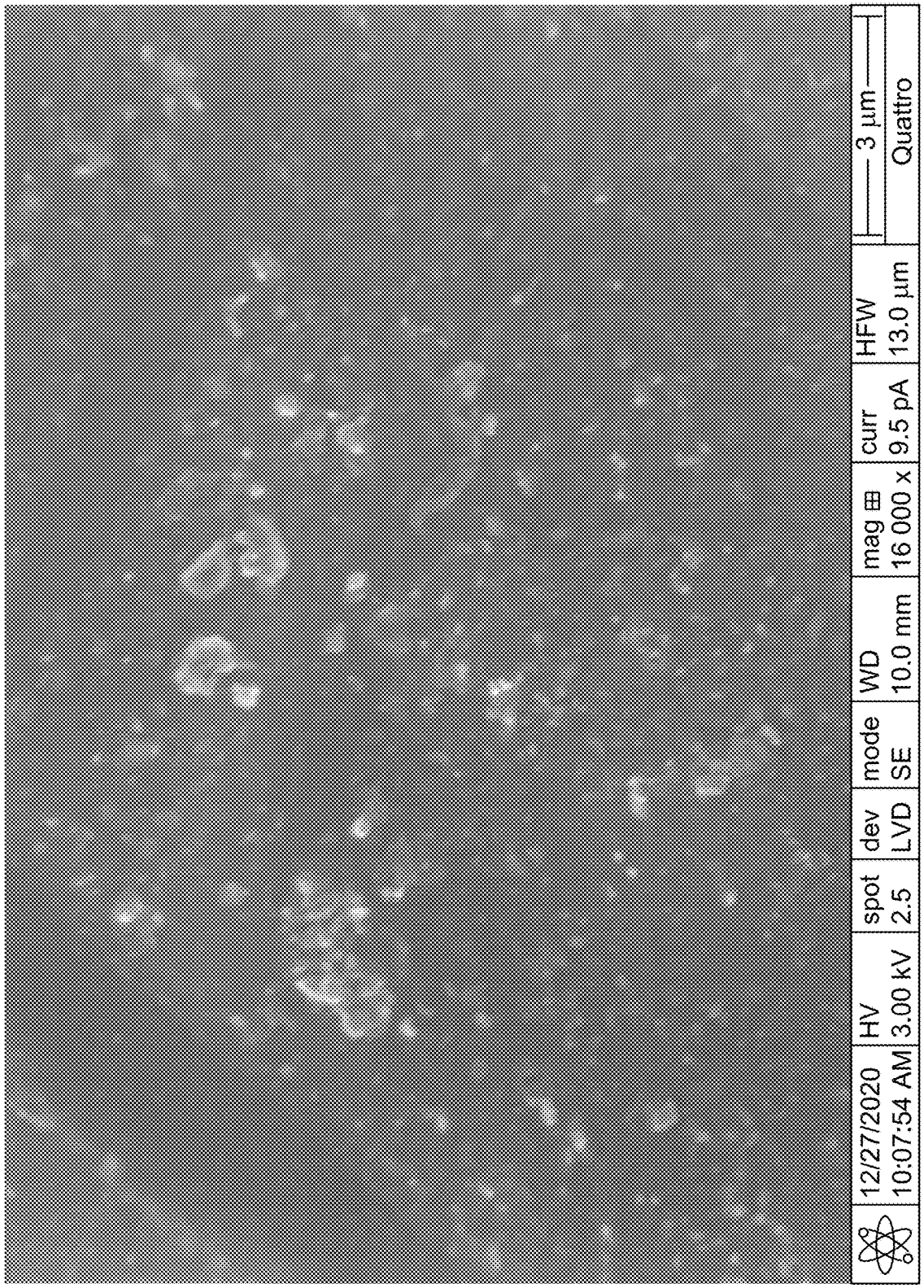

The FT-IR spectra of samples, namely PVC-A 5% (402), PVC-A 2% (404), PVC-A 1% (406), PVC-A 0.5% (408), PVC (410), AM-A (412), AM-FA (452), PVC (454), PVC-FA 0.5% (456), PVC-FA 1% (458), PVC-FA 2% (460), PVC-FA 5% (462), are depicted in graph (400) as shown in the FIGS. 4A and 4B, respectively. The spectra of all the samples show the presence of the traditional absorption bands of C-H. These high-intensity peaks at 2851 and 2921 $cm^{-1}$ are attributed to the vibration mode of the chain methylene (-$CH_2$-) groups and (stretching of C-H bonds). The peaks at 1467 $cm^{-1}$ are attributed to the bending vibrations of symmetric methylene groups (-$CH_2$-), and the peak at 721 $cm^{-1}$ corresponds to -$CH_2$- rocking (deformation and elongation mode of $CH_2$ group). The FT-IR spectrum of the PVC (410) includes C-Cl stretching at 700 $cm^{-1}$ and some spectra of the additives (1728, 1625 $cm^{-1}$). In the PVC/asphaltene composites (FIG. 4A), almost the composites were recorded with the same spectra since the same characteristic chemical groups appear in the asphaltenes as in the PVC, except the C–Cl band, which are mainly C–H bonds in either -$CH_2$ or -$CH_3$. In the case of functionalized asphaltene (AM-F), clear peaks indicating the appearance of C=O and C–O bonds on oxidation were observed, as shown in FIG. 4B.

SEM observations

SEM images of all asphaltene, functionalized asphaltene, and their PVC composites appear in FIGS. 5A-5K, respectively. Higher agglomerates were observed with increased asphaltene content in a few samples, while more dispersed composites were found with the functionalized asphaltenes.

Thermogravimetric Analysis

Figure 6A:
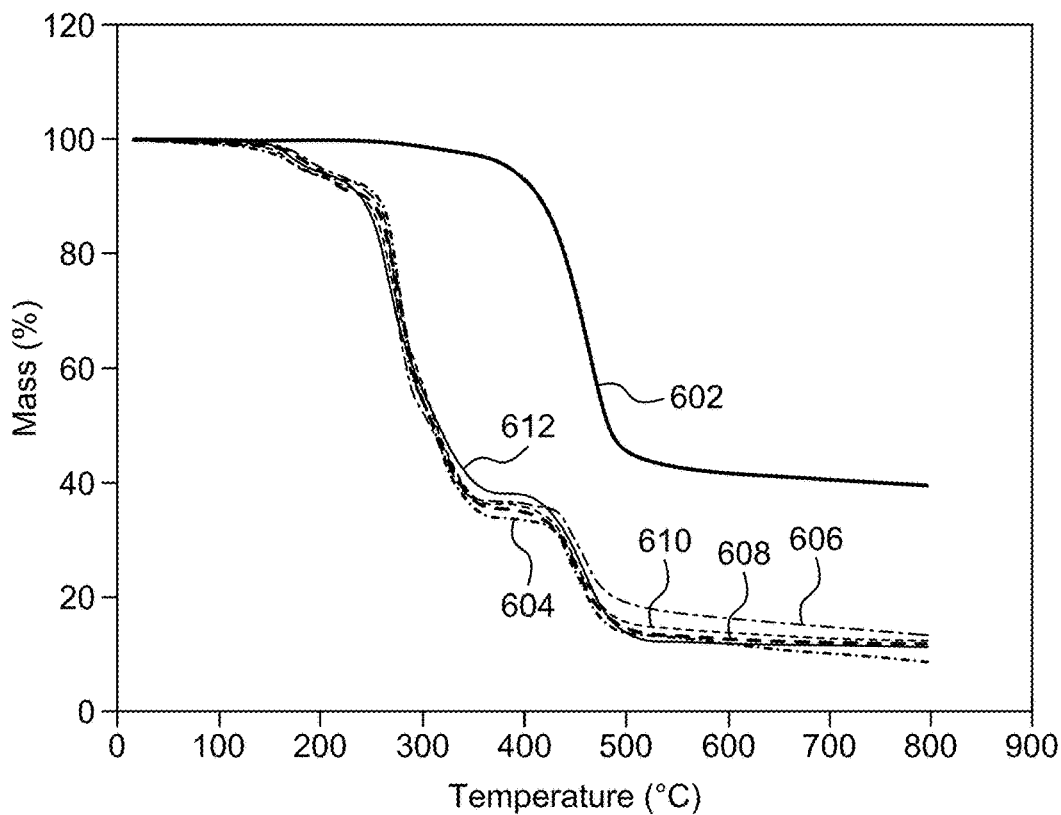
FIG. 6A shows thermal degradation curves of asphaltene, PVC, and the PVC/asphaltene composites (each with different weight percentages of asphaltene), obtained from a TGA scan at 10° C/min, according to certain embodiments.
Figure 6B:
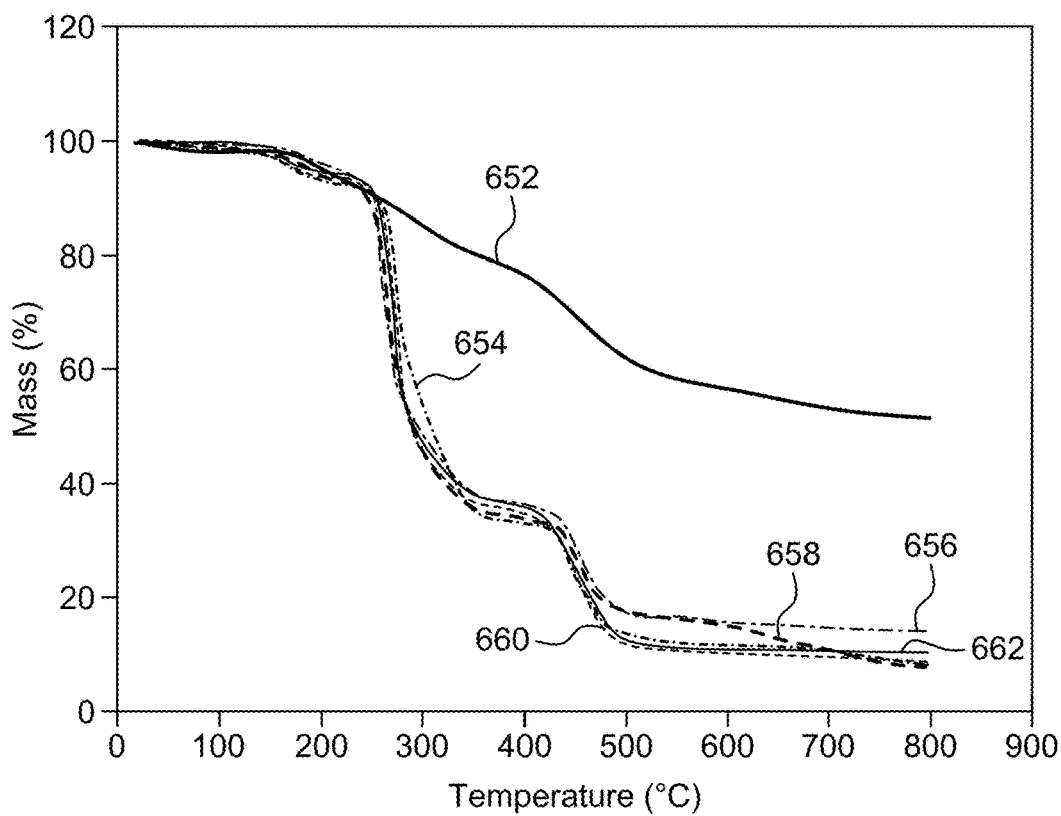
FIG. 6B shows thermal degradation curves of functionalized asphaltene, PVC, and the PVC/functionalized asphaltene composites (each with different weight percentages of functionalized asphaltene), obtained from the TGA scan at 10° C/min, according to certain embodiments.

Thermal stability of different samples, namely, asphaltene (602), PVC (604), PVC/asphaltene composites with different weight percentages of asphaltenes, namely PVC-A 0.5% (606), PVC-A 1% (608), PVC-A 2% (610), and PVC-A 5% (612) are shown in FIG. 6A; and the thermal stability of functionalized asphaltene (652), PVC (654), and the PVC/functionalized asphaltene composites with different weight percentages of the functionalized asphaltenes, namely PVC-FA 0.5% (656), PVC-FA 1% (658), PVC-FA 2% (660), and PVC-FA 5% (662) are shown in FIG. 6B. From the FIGS. 6A and 6B, it can be observed that the degradation completes in one step in all the different samples, and the curves shifted to higher temperature values for all the PVC/asphaltene composites and PVC/functionalized asphaltene composites compared to the PVC. This data demonstrates that all composites have better thermal stability than the PVC. The initial decomposition temperature of all the composites was shifted to higher temperatures than the PVC, confirming the protecting role of the asphaltenes in the thermal stability of PVC. Best thermal stability was achieved in the PVC-A and PVC-FA composites with 2 wt.% additives. The addition of asphaltene/functionalized asphaltene at this concentration may form a protective layer (thermal shield) around the polymer molecules. The thermal shield may delay the degradation induced by heat and/or may act as a thermal barrier limiting the emission of the gaseous degradation products, increasing the thermal stability of the composite. Most effective protection was achieved with about 2 wt.% of asphaltene; however, at higher amounts of asphaltene, the thermal stability of the composite was found to be reduced. This could be because the homogeneous dispersion of asphaltenes might prevent the volatilizing matrix from escaping to the atmosphere. At higher amounts, the asphaltenes may form agglomerates resulting in a non-homogeneous mixture.

Mechanical Properties

Figure 7:
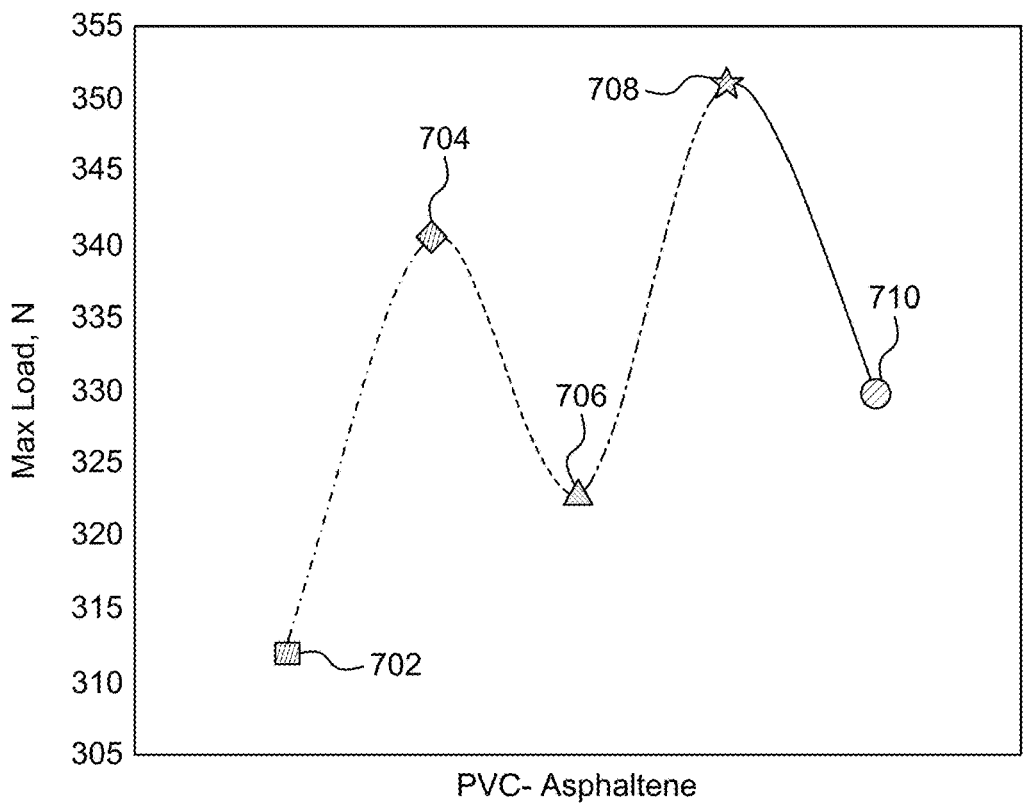
FIG. 7 is a graph showing a maximum load for various PVC/asphaltene composites, according to certain embodiments.

Tensile mechanical properties, such as maximum load (FIG. 7), tensile strength (FIG. 8), percentage elongation (FIG. 9), modulus of elasticity (FIG. 10), and yield stress (FIG. 11) of PVC and PVC/asphaltene composites were determined. The maximum load for various samples, namely PVC (702), PVC-A 0.5% (704), PVC-A 1% (706), PVC-A 2% (708), and PVC-A 5% (710) was determined, and the results are presented in FIG. 7, and Table 2. From Table 2, it can be observed that the max load was higher than PVC for all the samples with asphaltene. Max. load was the highest for the sample with 2% of asphaltene; however, at percentages beyond 2% of asphaltene, the max load was reduced, as observed with the sample PVC-A 5% (710).

Figure 8:
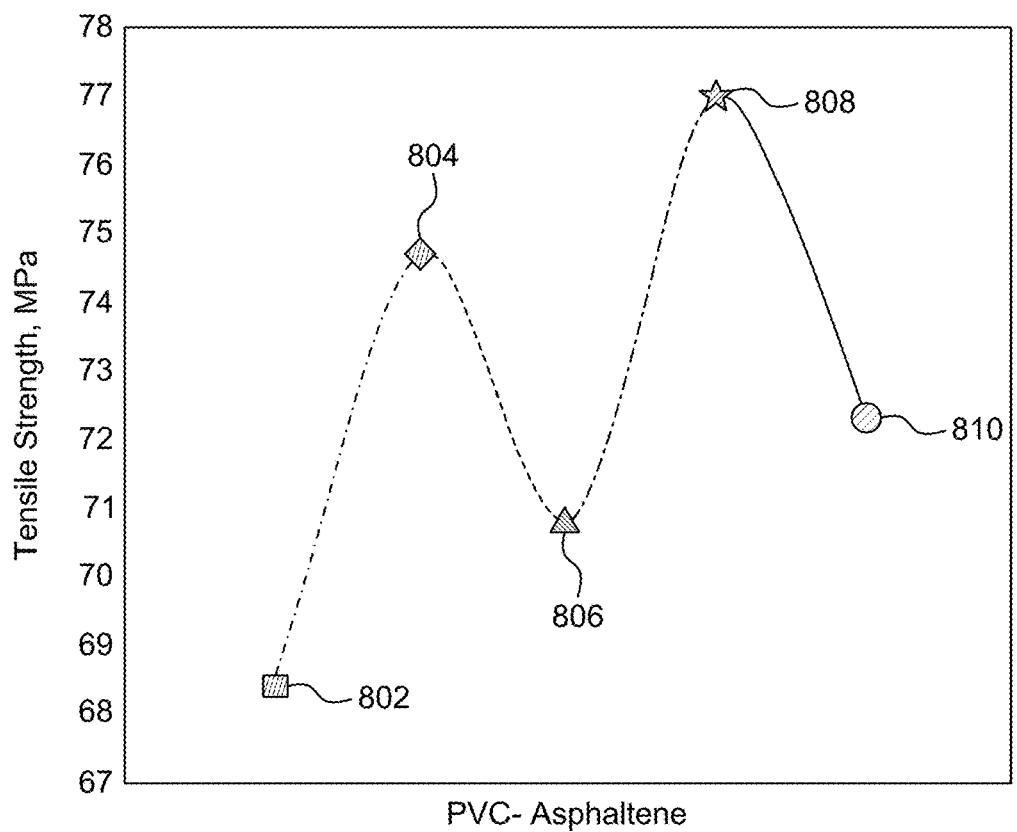
FIG. 8 is a graph showing a variation of tensile strength with a varying weight percentage of asphaltene in the PVC/asphaltene composites, according to certain embodiments.

Similar results were observed while determining the tensile strength for all the samples, PVC (802), PVC-A 0.5% (804), PVC-A 1% (806), PVC-A 2% (808), and PVC-A 5% (810). The results are shown in FIG. 8. The measurements show that the highest tensile strength was measured for the PVC-A 2% composite (808). The dispersion of asphaltene in the PVC matrix became difficult at higher weight percentages of asphaltene and resulted in lower tensile strength.

Figure 9:
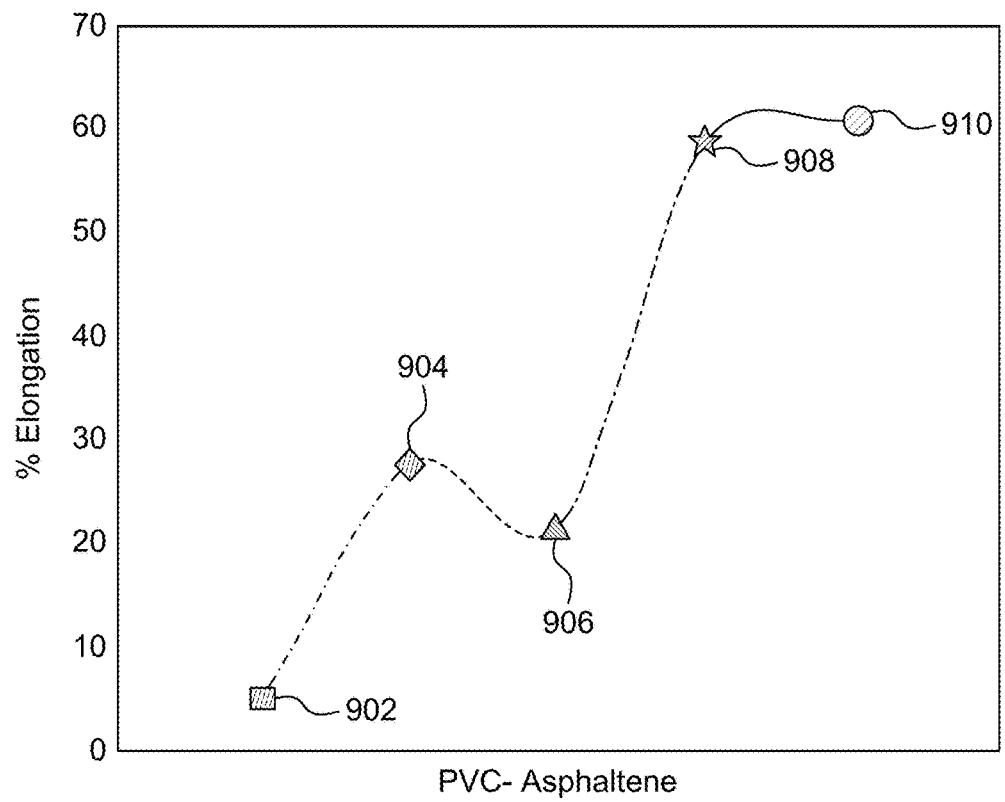
FIG. 9 shows a percentage elongation for the various PVC/asphaltene composites, according to certain embodiments.

Percent elongation is a measurement that captures the amount the composite would plastically and elastically deform up to fracture. The measurements were performed for the samples PVC (902), PVC-A 0.5% (904), PVC-A 1% (906), PVC-A 2% (908), and PVC-A 5% (910). The results are shown in FIG. 9. From the measurements, it can be observed that the percentage elongation increased with an increasing amount of asphaltene in the composite. The percent elongation was the maximum for the sample with 5% PVC-A and 5% (912). However, the results were found to be improved over PVC in the composite with 2% of asphaltene, i.e. . . . , PVC-A 2% (910).

Figure 10:
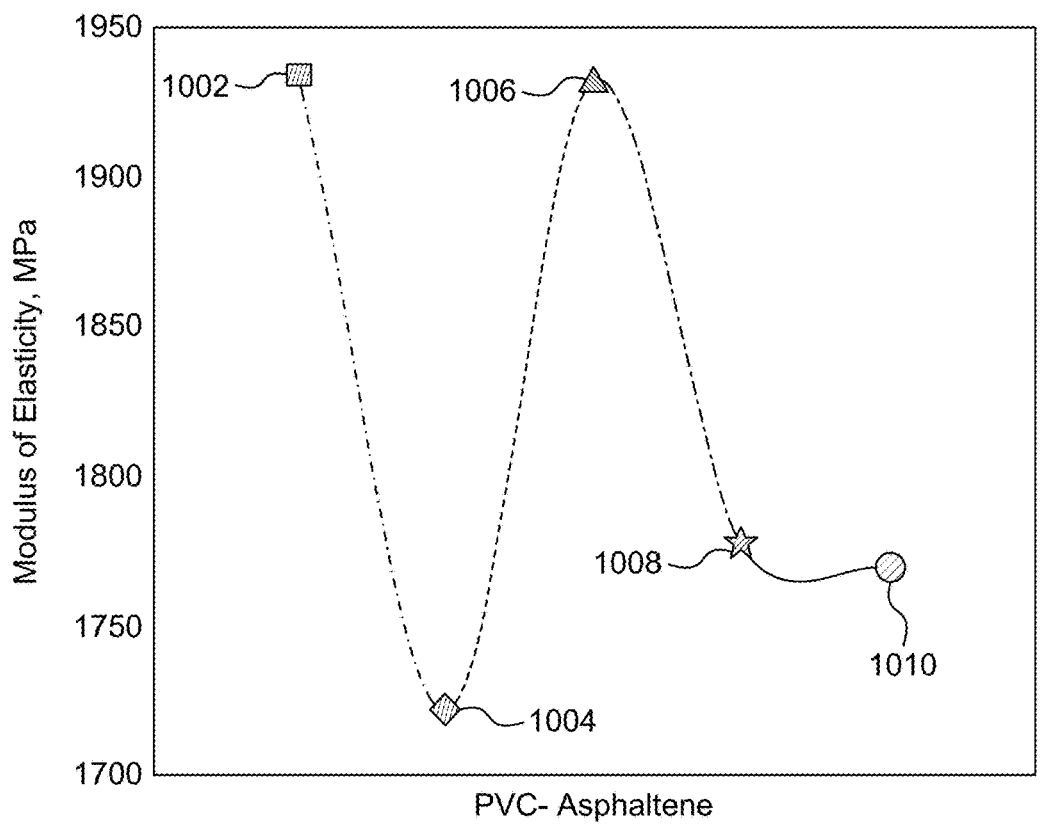
FIG. 10 shows a modulus of elasticity for the various PVC/asphaltene composites, according to certain embodiments.
Figure 11:
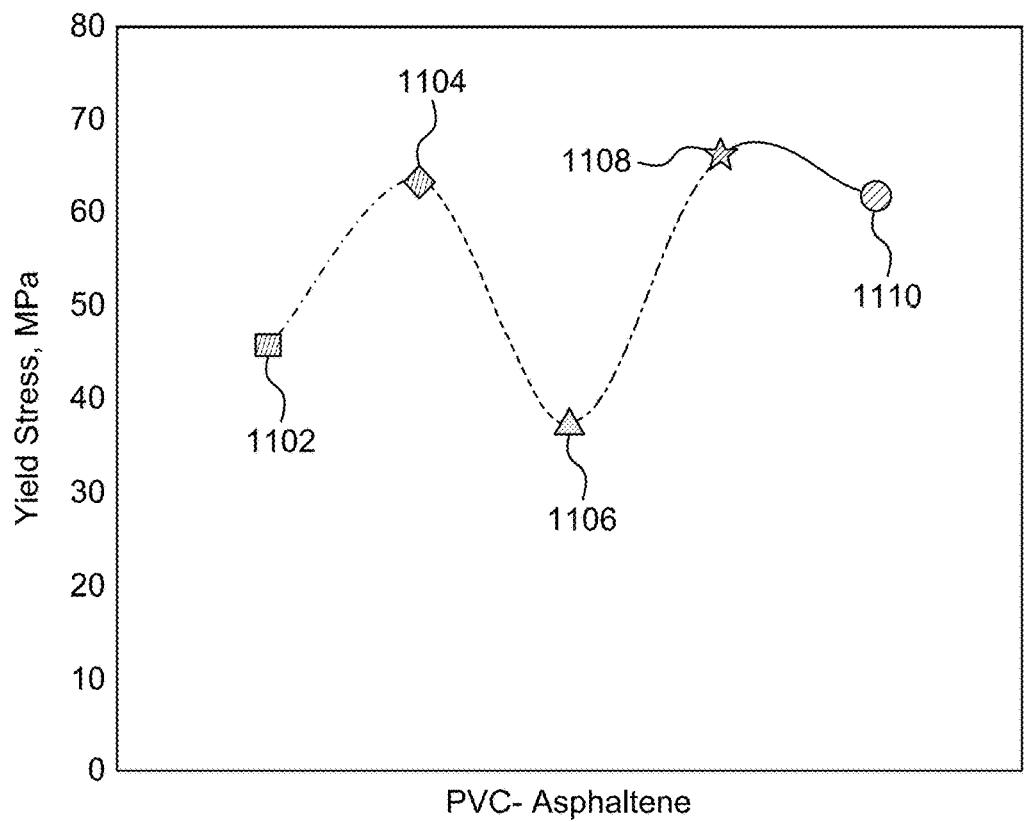
FIG. 11 shows yield stress for the various PVC/asphaltene composites, according to certain embodiments.
Figure 12:
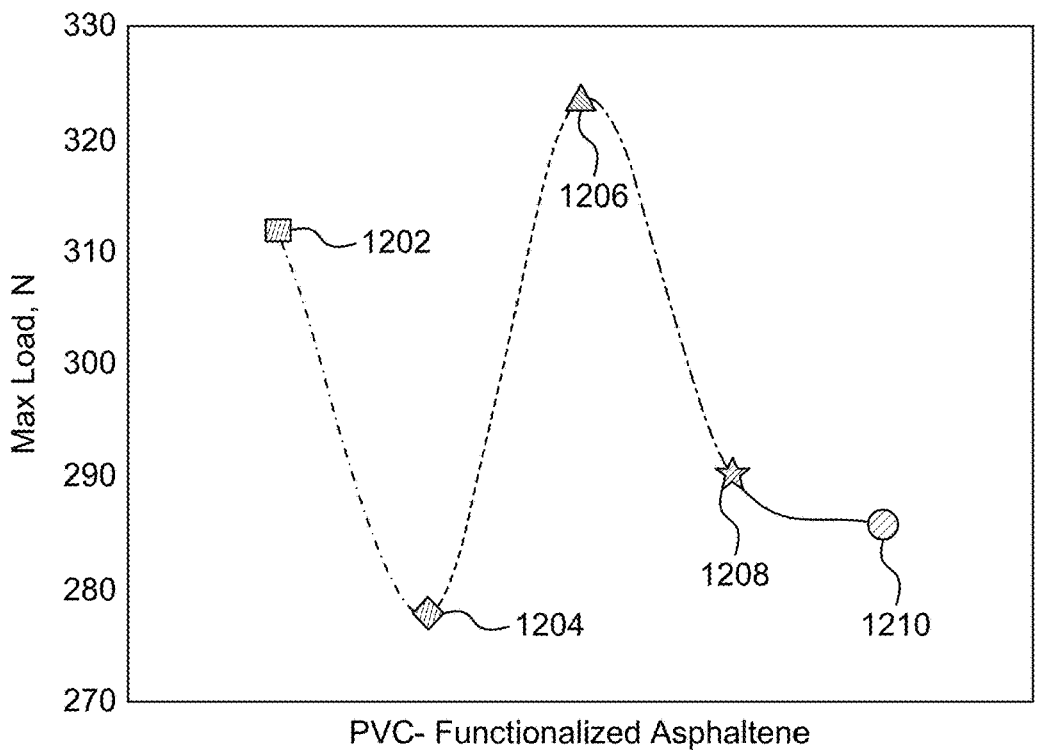
FIG. 12 is a graph showing a maximum load for various PVC/functionalized asphaltene composites, according to certain embodiments.
Figure 13:
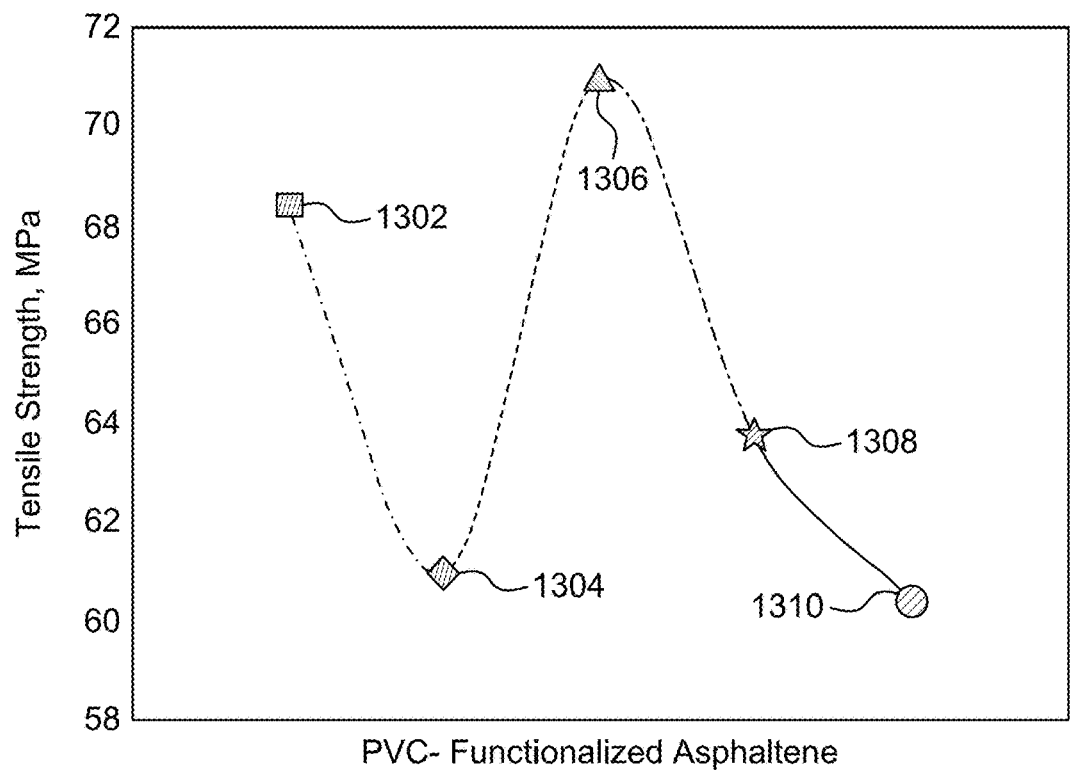
FIG. 13 is a graph showing a variation of tensile strength with a varying weight percentage of asphaltene in the PVC/functionalized asphaltene composites, according to certain embodiments.
Figure 14:
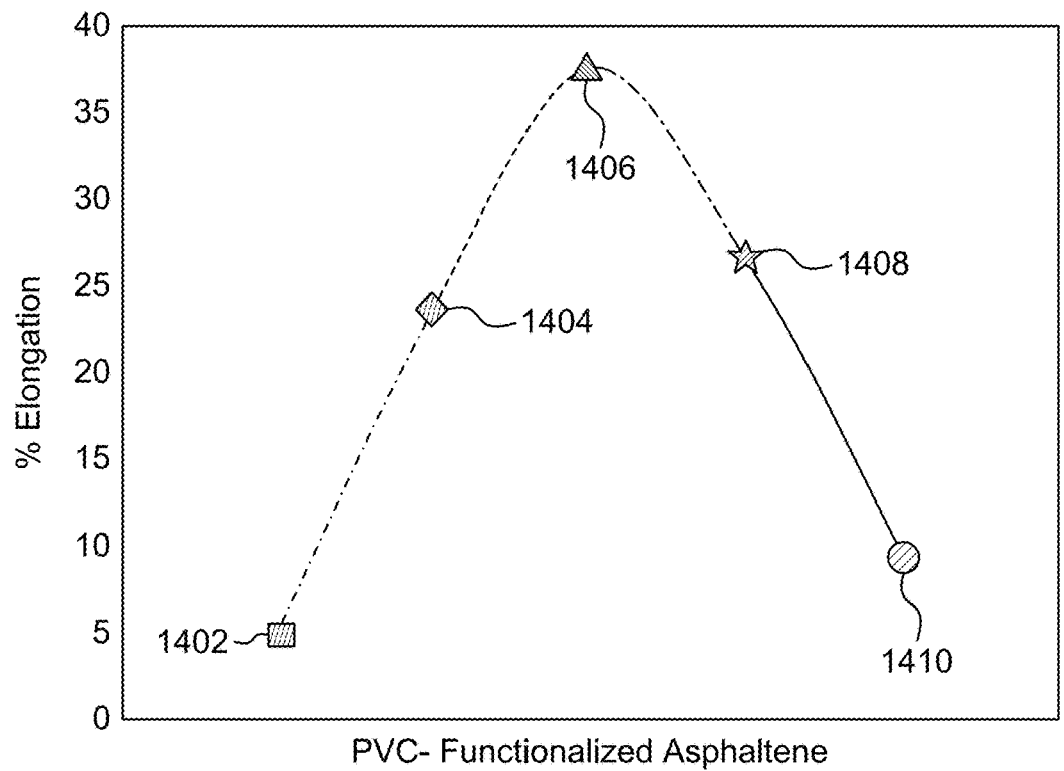
FIG. 14 shows a percentage elongation for the various PVC/functionalized asphaltene composites, according to certain embodiments.
Figure 15:
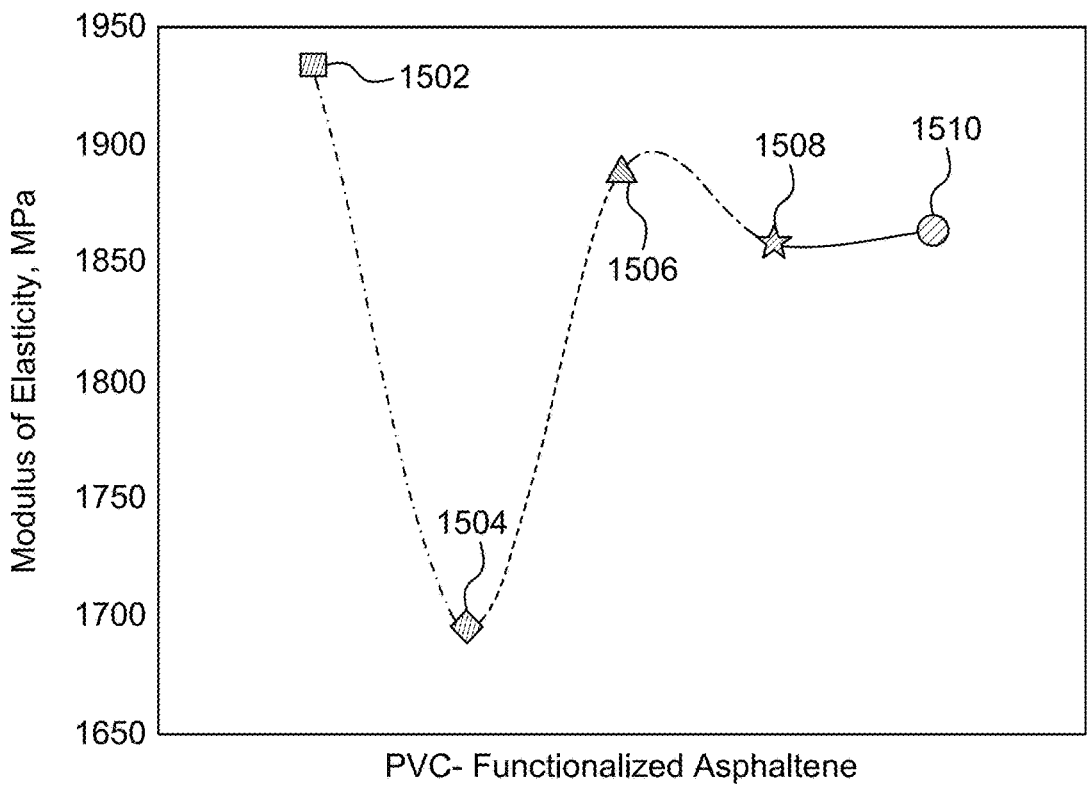
FIG. 15 shows a modulus of elasticity for the various PVC/functionalized asphaltene composites, according to certain embodiments.
Figure 16:
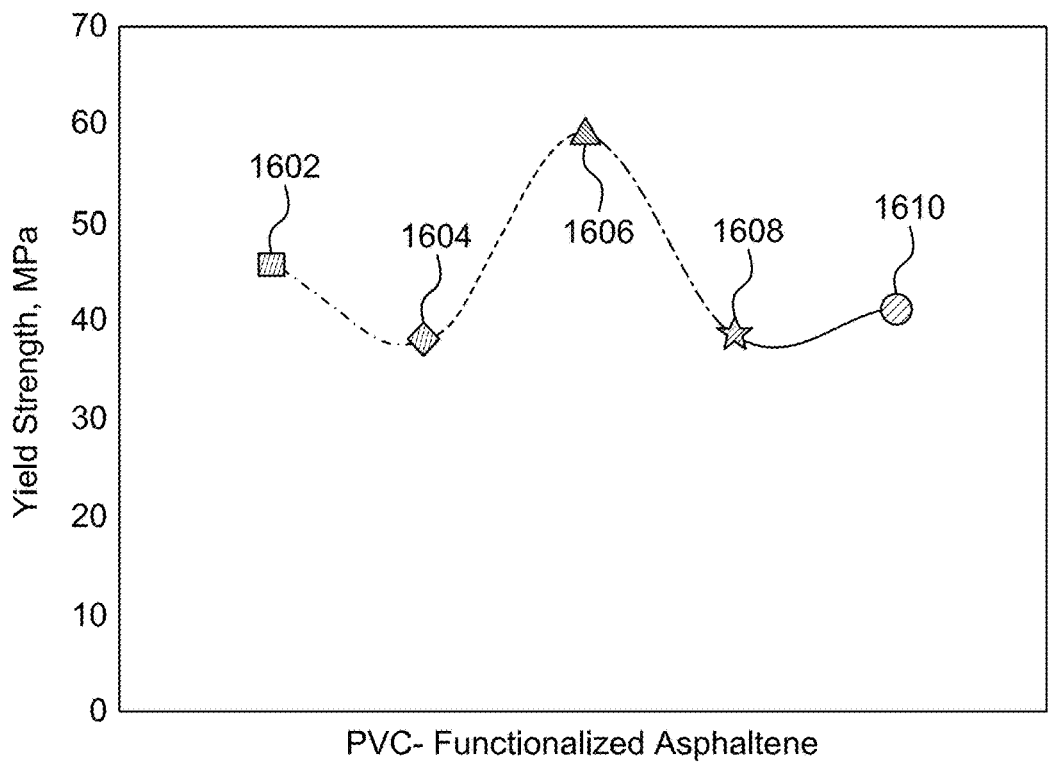
FIG. 16 shows yield stress for the various PVC/functionalized asphaltene composites, according to certain embodiments.

Modulus of elasticity for the samples PVC (1002), PVC-A 0.5% (1004), PVC-A 1% (1006), PVC-A 2% (1008), and PVC-A 5% (1010), and yield stress for the samples PVC (1102), PVC-A 0.5% (1104), PVC-A 1% (1106), PVC-A 2% (1108), and PVC-A 5% (1110), were determined; the results of this study are shown in FIG. 10 and FIG. 11 respectively. Modulus of Elasticity, also known as elastic modulus or simply modulus, is the measurement of the composite's elasticity. Elastic modulus quantifies the composite's resistance to non-permanent or elastic deformation. Modulus was lower for all the samples compared to the PVC, indicating a more elastic behavior. Results were comparable to PVC for the sample PVC-A 1% (1006), as observed in FIG. 10.

Yield stress marks the transition from elastic to plastic behavior, which is the minimum stress at which the composite undergoes permanent deformation or plastic flow without a significant increase in the load or external force. From the measurements in Table 2, it can be observed that the yield stress was found to be maximum (about 66.245) for the sample PVC-A 2% (1108). At percentages beyond 2%, the yield stress was reduced, as can be observed with the sample PVC-A 5% (1110). Best additive-matrix adhesion is obtained at a relative amount of asphaltene equal to 2 wt.%.

TABLE 2

Tensile mechanical properties from Instron analysis and storage modulus from PVC and its composites with asphaltenes.

| Sample | Max. load (N) | Tensile strength (MPa) | (%) Elongation | Modulus of elasticity (MPa) | Yield stress (MPa) |
|---|---|---|---|---|---|
| PVC | 311.87 | 68.405 | 4.995 | 1933.765 | 45.68 |
| PVC-A 0.5% | 340.57 | 74.70 | 27.68 | 1723.01 | 63.39 |
| PVC-A 1% | 323.05 | 70.855 | 21.69 | 1932.55 | 37.485 |
| PVC-A 2% | 351.07 | 77 | 58.645 | 1776.885 | 66.245 |
| PVC-A 5% | 330 | 72.38 | 60.65 | 1769.855 | 61.95 |

Similarly, the tensile mechanical properties of PVC and PVC/functionalized asphaltene composites were determined, and the results of this study are shown in the FIGS. 12-16, and Table 3. The maximum load for various samples, namely PVC (1202), PVC-FA 0.5% (1204), PVC-FA 1% (1206), PVC-FA 2% (1208), and PVC-FA 5% (1210) was determined, and the results of this study are presented in FIG. 12, and Table 3. From Table 3, it can be observed that the max load was higher than PVC for the samples with 1% functionalized asphaltene, i.e., PVC-FA 1% (1206). Similar results were observed while determining the tensile strength for all the samples, PVC (1302), PVC-FA 0.5% (1304), PVC-FA 1% (1306), PVC-FA 2% (1308), and PVC-FA 5% (1310), as can be observed in FIG. 13. The measurements show that the highest tensile strength was measured for the PVC-FA 1% composite (1306). From the measurements, it can be observed that the highest tensile strength was measured for the PVC-FA 1% composite. The dispersion of functionalized asphaltene in the PVC matrix became difficult at higher weight percentages of functionalized asphaltene and resulted in lower tensile strength. Best additive-matrix adhesion is obtained at a relative amount of asphaltene equal to 1 wt.%.

TABLE 3

Tensile mechanical properties from Instron analysis and storage modulus from PVC and its composites with functionalized asphaltenes.

| Sample | Max Load (N) | Tensile Strength (MPa) | (%) Elongation | Modulus of Elasticity (MPa) | Yield Stress (MPa) |
|---|---|---|---|---|---|
| PVC | 311.87 | 68.405 | 4.995 | 1933.765 | 45.68 |
| PVC-FA 0.5% | 278.03 | 60.98 | 23.715 | 1696.315 | 38.1 |
| PVC-FA 1% | 323.84 | 71.03 | 37.59 | 1889.78 | 59.11 |
| PVC-FA 2% | 290.28 | 63.67 | 26.62 | 1857.98 | 38.58 |
| PVC-FA 5% | 285.88 | 60.43 | 9.52 | 1863.65 | 41.28 |

Percent elongation is a measurement that captures the amount the composite would plastically and elastically deform up to fracture. The study was performed for the samples PVC (1402), PVC-FA 0.5% (1404), PVC-FA 1% (1406), PVC-FA 2% (1408), and PVC-FA 5% (1410), which can be observed in FIG. 14. From the measurements in Table 3, it can be observed that the percentage elongation was found to be better than PVC for all the samples tested. An increase in percentage elongation was observed with increased functionalized asphaltene in the composite up to 1%. At percentages beyond 1% of functionalized asphaltene in the composite, the percentage elongation was reduced. Modulus of elasticity for the samples PVC (1502), PVC-FA 0.5% (1504), PVC-FA 1% (1506), PVC-FA 2% (1508), and PVC-FA 5% (1510), can be observed in FIG. 15, and yield stress for the samples PVC (1602), PVC-FA 0.5% (1604), PVC-FA 1% (1606), PVC-FA 2% (1608), and PVC-FA 5% (1610), can be observed in FIG. 16. Modulus was lower for all the samples compared to the PVC, indicating a more elastic behavior. Results were comparable to PVC for the sample PVC-FA 1% (1506), as observed in FIG. 15. Yield stress is the minimum stress at which the composite undergoes permanent deformation or plastic flow without significantly increasing load or external force. From the measurements in Table 3, it can be observed that the yield stress was found to be maximum (about 59.11) for the sample PVC-FA 1% (1606). At percentages beyond 1% of functionalized asphaltene, the yield stress was reduced, as can be observed with the sample PVC-FA 5% (1610).

Obviously, numerous modifications and variations of the present disclosure are possible in light of the above teachings. It is therefore to be understood that within the scope of the appended claims, the invention may be practiced otherwise than as specifically described herein.

The invention claimed is:

1. A polyvinyl chloride-asphaltene composite, comprising:
   a polyvinyl chloride (PVC) polymer in an amount of 90 to 99.5 wt.%, based on a total weight of the polyvinyl chloride-asphaltene composite; and
   a filler in an amount of 10 wt.% or less, based on a total weight of the polyvinyl chloride-asphaltene composite;
   wherein:
   the filler is an asphaltene composition;
   the asphaltene composition is the only filler present; and
   the asphaltene composition is uniformly dispersed within a matrix of the PVC polymer; and
   wherein the asphaltene composition is a mixture of an asphaltene and an acid functionalized asphaltene comprising oxygen-containing functional groups which are at least one selected from the group consisting of nitro groups, carbonyl groups, and carboxyl groups.

2. The polyvinyl chloride-asphaltene composite of claim 1, wherein the asphaltene is extracted from Arabian Medium crude oil.

3. The polyvinyl chloride-asphaltene composite of claim 1, which consists essentially of the PVC polymer and the asphaltene composition.

4. The polyvinyl chloride-asphaltene composite of claim 1, which consists of the PVC polymer and the asphaltene composition.

5. The polyvinyl chloride-asphaltene composite of claim 1, wherein the PVC polymer has a density of 1.10 to 1.45 g/cm$^3$, and a number average molecular weight of 20,000 to 105,000 g/mol.

6. The polyvinyl chloride-asphaltene composite of claim 1, wherein the asphaltene has a hydrogen-to-carbon atomic ratio of 1.1 to 1.25.

7. The polyvinyl chloride-asphaltene composite of claim 1, wherein the asphaltene has a ratio of aliphatic carbons to aromatic carbons of 1.5:1 to 3:1, and a ratio of aliphatic hydrogens to aromatic hydrogens of 8:1 to 14:1.

8. The polyvinyl chloride-asphaltene composite of claim 2, wherein the asphaltene composition is present in an amount of 0.25 wt.% to 7.5 wt.% based on the total weight of the polyvinyl chloride-asphaltene composite.

9. The polyvinyl chloride-asphaltene composite of claim 2, wherein the asphaltene composition is present in an amount ranging from 0.5 wt.% to 5 wt.% based on the total weight of the polyvinyl chloride-asphaltene composite.

10. The polyvinyl chloride-asphaltene composite of claim 1, wherein the asphaltene composition is present in an amount of 0.25 wt.% to 7.5 wt.% based on the total weight of the polyvinyl chloride-asphaltene composite.

11. The polyvinyl chloride-asphaltene composite of claim 1, wherein the asphaltene composition is present in an amount ranging from 0.5 wt.% to 5 wt.% based on the total weight of the polyvinyl chloride-asphaltene composite.

12. The polyvinyl chloride-asphaltene composite of claim 1, which has at least two of the following properties:
   a tensile strength of 57.5 to 72.5 MPa;
   a yield strength of 30 to 70 MPa;
   a max load of 275 to 330 N;
   an elongation at break of 5 to 40%; and
   a modulus of elasticity of 1500 to 1925 MPa, as determined by ASTM standard D638-02a.

13. The polyvinyl chloride-asphaltene composite of claim 1, which has a thermal degradation at 50% conversion, $T_{50\%}$, which is 5 to 25° C. higher than a polyvinyl chloride devoid of the asphaltene, a thermal degradation onset, $T_{2\%}$, which is 5 to 25° C. higher than a polyvinyl chloride devoid of the asphaltene, or both, as determined by thermogravimetric analysis.

14. A method of preparing the polyvinyl chloride-asphaltene composite of claim 1, comprising:
   isolating an asphaltene extract from crude oil by heptane extraction;
   functionalizing at least a portion of the asphaltene extract with nitric acid to form a functionalized asphaltene;
   mixing the asphaltene extract, the functionalized asphaltene and a first organic solvent to form a solvent mixture;
   ultrasonically treating the solvent mixture to form an asphaltene solution;
   dispersing a PVC polymer in a second organic solvent to form a PVC solution;
   mixing the asphaltene solution and the PVC solution to form a casting mixture; and
   removing the first organic solvent and the second organic solvent to form the polyvinyl chloride-asphaltene composite.

15. The method of claim 14, wherein the first organic solvent and the second organic solvent are tetrahydrofuran.

16. The method of claim 14, wherein the functionalized asphaltene comprises nitro groups.

17. The method of claim 14, wherein:
   the asphaltene is derived from Arabian Medium crude oil, and the asphaltene composition comprises 80 to 86 wt.% of carbon atoms, 6.2 to 10.0 wt.% of hydrogen atoms, 10 to 20 ppm of nickel, and 30 to 60 ppm of vanadium, each based on a total weight of the asphaltene; and
   the PVC polymer has a density of 1.10 to 1.45 g/cm$^3$ and a number average molecular weight of 20,000 to 105,000 g/mol.

* * * * *